United States Patent
Redlich

(10) Patent No.: US 12,554,868 B2
(45) Date of Patent: Feb. 17, 2026

(54) MULTI-MODAL, MODULAR DATA SECURITY AND MONETIZATION SYSTEM AND METHOD

(71) Applicant: Ron M. Redlich, Miami Beach, FL (US)

(72) Inventor: Ron M. Redlich, Miami Beach, FL (US)

( * ) Notice: Subject to any disclaimer, the term of this patent is extended or adjusted under 35 U.S.C. 154(b) by 394 days.

(21) Appl. No.: 17/959,912

(22) Filed: Oct. 4, 2022

(65) Prior Publication Data

US 2024/0111880 A1 Apr. 4, 2024

(51) Int. Cl.
*G06F 21/60* (2013.01)
*G06F 21/55* (2013.01)

(52) U.S. Cl.
CPC .......... *G06F 21/604* (2013.01); *G06F 21/554* (2013.01); *G06F 21/602* (2013.01); *G06F 2221/2141* (2013.01)

(58) Field of Classification Search
CPC ...... G06F 21/60; G06F 21/604; G06F 21/554; G06F 21/602; G06F 2221/2141
See application file for complete search history.

(56) References Cited

U.S. PATENT DOCUMENTS

| | | | | | |
|---|---|---|---|---|---|
| 8,543,806 | B2 * | 9/2013 | Peckover | ............... | G16H 40/67 713/151 |
| 9,015,301 | B2 | 4/2015 | Redlich et al. | | |
| 10,448,251 | B1 * | 10/2019 | Maria | ................... | H04W 12/06 |
| 11,461,785 | B2 | 10/2022 | Redlich | | |
| 11,640,449 | B2 * | 5/2023 | Groth | ..................... | G06N 20/10 726/26 |
| 11,790,117 | B2 * | 10/2023 | LaFever | .............. | G06F 21/6254 713/162 |
| 11,805,105 | B2 * | 10/2023 | Bertram | ............... | G06Q 30/018 |

(Continued)

OTHER PUBLICATIONS

Hongda Li, Peifang Ni and Dongxue Pan, Some Low Round Zero-Knowledge Protocols Cryptology ePrint Archive, Paper 2020/347 https://eprint.iacr.org/2020/347.

(Continued)

*Primary Examiner* — Hosuk Song
(74) *Attorney, Agent, or Firm* — The Concept Law Group, P.A.; Robert C. Kain, Jr.

(57) ABSTRACT

System and method secures critical data on distributed ledger (DL) or blockchain (Bchn) or linked memory cell (LCM) data construct. Each cell in DL/Bchn/LCM has cellular immutability and cellular connectivity characteristics. System randomly stores critical data in the DL/Bchn/LCM based with initial state function and stores nonsensical data in other cells based upon nonsensical initial state function which is inferior to the critical data function. The DL/Bchn/LCM has a stem, with stem cells, forking cells and branches with branch cells created by forking initial state function (sometimes triggered by cyber attacks, sometimes by new growth). Trees of DL/Bchn/LCM are formed as are forests of DL/Bchn/LCM trees. automatic information search operations (AISO) through data collections also grow stems and branches on the DL/Bchn/LCM trees. The AISO generates supplemental (Supple) data based on supple initial state function. Supple data is further dispersed and randomly stored in the DL/Bchn/LCM trees and/or forest.

38 Claims, 4 Drawing Sheets

(56) References Cited

U.S. PATENT DOCUMENTS

| | | | |
|---|---|---|---|
| 11,915,308 B2* | 2/2024 | Eichel | G06Q 20/1235 |
| 12,033,120 B1* | 7/2024 | Stroke | G06Q 20/0658 |
| 2006/0212698 A1* | 9/2006 | Peckover | H04L 63/08 |
| | | | 713/151 |
| 2010/0010968 A1 | 1/2010 | Redlich et al. | |
| 2023/0198961 A1* | 6/2023 | Watanabe | G09C 1/00 |
| | | | 713/171 |

OTHER PUBLICATIONS

Hawig D, Zhou C, Fuhrhop S, Fialho AS, Ramachandran N. Designing a Distributed Ledger Technology System for Interoperable and General Data Protection Regulation-Compliant Health Data Exchange: A Use Case in Blood Glucose Data. J Med Internet Res. Jun. 14, 2019;21(6):e13665. doi: 10.2196/13665. PMID: 31199293; PMCID: PMC6595943.

International Telecommunication Union, DLT use cases—Technical Report FG DLT D2.1 Distributed ledger technology use cases; Published on Aug. 1, 2019.

Dirk A. Zetzsche, Linn Anker-Sørensen, Maria Lucia Passador and Andreas Wehrli, BIS Working Papers No. 1015, DLT-Based Enhancement of Cross-Border Payment Efficiency—a Legal and Regulatory Perspective, Bank for International Settlements—Published on May 20, 2022.

Mohamed F. Mokbel, Walid G. Aref and Ibrahim Kamel, "Performance of Multi-Dimensional Space—Filling Curves" (2002). Department of Computer Science Technical Reports. Paper 1546. https://docs.lib.purdue.edu/cstech/1546.

Cooper, D.A., Yalcin, T., Nistor, C., Macrini, M. and Pehlivan, E. (2022), "Privacy considerations for online advertising: a stakeholder's perspective to programmatic advertising", Journal of Consumer Marketing https://doi.org/10.1108/JCM-04-2021-4577.

Arcenegui, J.; Arjona, R.; Román, R.; Baturone, I. "Secure Combination of IoT and Blockchain by Physically Binding IoT Devices to Smart Non-Fungible Tokens Using PUFs". Sensors 2021, 21, 3119. https://doi.org/10.3390/s21093119.

Gary Rowe, CEO and Principal Consulting Analyst Doug Simmons, Principal Consulting Analyst Zero Knowledge Authentication & Authorization: Soon the New Normal? Tech VisionRESEARCH Published Aug. 24, 2020.

* cited by examiner

MULTI-MODAL, MODULAR DATA SECURITY AND MONETIZATION SYSTEM AND METHOD

The present invention relates to a multi-modal, modular data security and monetization system and method generally centered on data security concepts and processes, but also deploying data security concepts onto a monetization platform for the sale, license or commercial distribution of packets of data (data outputs) to interested persons or entities. Scarcity sometimes enhances the value of an item. For example, a limited 100 print lithographic run of an original piece of art may, in the first instance, diminish the value of the original artwork, but if the value of the original piece is later highly priced at auction, each print in the limited print run increases in price due to the 1+100 scarcity of the artwork. Data security is centered on concepts of scarcity. Therefore, a system and method which secures and assures the secrecy of a data object or document can be enhanced by adding relevant add-on data to the original data object/document and persons interested in the document's subject matter will pay for access to the enhanced data object or document. Therefore, the MMM system and process can be configured to monetize a data output.

BACKGROUND OF THE INVENTION

Prior art data security systems and process include establishing or identifying security sensitive words, phrases, data objects or other digital informative elements in input data document or data stream, filtering sensitive data, extracting sensitive data, and storing the same in secure data stores or locations commensurate with the sensitivity or security level of the parsed data. Security sensitive words, select or important content, phrases, data objects or other digital informative elements in input data document or data stream, meta data, and all data objects are defined herein as "critical data." Filters are used and maps identify data stores with an eye towards reconstructing the data, based upon a later input data security level. Once securely stored, the filter and/or map may be destroyed or stored along with the original input data. Encryption is typically used and reconstruction is permitted only in the presence of a predetermined security clearance, thereby enabling full or partial reconstruction based upon the later applied security clearance. See, for example, U.S. Pat. Nos. 7,103,915 and 8,677,505.

U.S. Pat. No. 11,461,785 to Redlich, entitled "System and Method to Identify, Classify and Monetize Information as an Intangible Asset and a Production Model Based Thereon" discloses a method and system for monetizing data. The method and system identifies, classifies and monetizes intangible asset (I.A.) unstructured digital data by ownership characterizations and intellectual property (I.P.) classifications. Enterprise (E) and non-enterprise (NE) data collections are searched based upon an expanded project specification of descriptive functions, characteristics and objectives (a data input). Primary search terms from the project are expanded by content, contextual and taxonomic analysis (CCT analysis) to generate a plurality of search string parameters employed to search the E and NE data collections. A search engine returns data and documents, ownership characteristics are ascertained by comparison of the data returns and I.P. classifications are made based upon the returns. The process also handles unstructured enterprise-specific data not otherwise located in the E or NE data collections and handles unstructured data from other I.A. programs such as H.R. performance modules, supply chain modules or CRM modules. Unstructured data matching an organized data set from project and the search returns is integrated into an organized data set output.

OBJECTS AND SUMMARY OF THE INVENTION

The present invention provides a multi-modal, modular data security and monetization system and method which more securely stores data, and establishes a data storage system and method wherein the security rules, protocols and algorithms are maintained, and yet are highly confidential and extremely difficult to decode unless one has the precise formula and function initially established by the sys-admin or user.

It is an object of the present invention to implement a highly secure, adaptive data storage platform which can react to numerous adverse attacks by bad actors and/or environmental conditions which may adversely impact (a) data security, (b) retrieval or reconstruction of the data, and (c) efforts to increase the informatic value of the secured data.

It is another object of the present invention to provide (a) secure, diverse and diffused storage of data, (b) expand the informatic value of the secured data, and (c) provide a monetization platform to sell, license or otherwise distribute enhanced or raw data as desired by the sys-admin.

In summary, the present invention is a method for securing critical data on a distributed ledger (DL) or blockchain (Bchn). Each respective DL or Bchn is formed with corresponding linked cells wherein each linked cell has a cellular immutability characteristic and a cellular connectivity characteristic. The system randomly stores critical data in random cells of the respective DL or Bchn based on a predetermined initial state function. Also the system stores nonsensical data in other cells, other than the random cells, in the respective DL or Bchn. The DL or Bchn may have further or other cells, other than the random cells and the nonsensical cells. An enhancement includes DLs or Bchns with a series of stem cells. The system forks a branch off the stem cells with a series of branch cells using a predetermined forking initial state function. Sometimes, the forking initial state function includes an initial state cellular quantity or a time-based condition. New growth branch cells or new growth stem cells are added to the branch or stem. Another enhancement generates a forest of DLs or Bchns. This forest has a plurality of n DLs or Bchns (preferably 25 or more DLs or Bchns). The system randomly stores critical data in random cells in the DLs and Bchns in the forest. Nonsensical data is stored in other cells, not the random cells.

To enhance security the system and method conducts automatic information search operations (AISO) through data collections external to the DL or Bchn using segments of the critical data to obtain supplemental data. By linking this new supplemental data from the data collections to the segments of critical data stored in the Bchn or DL, the supplemental data is then dispersed and randomly stored in the DL or Bchn. The system can also detect a cyber attack directed to the respective DLs or Bchns, then fork a series of branch cells off the stem cells on the DLs or Bchns by executing a predetermined forking initial state function. This fork forms a branch on the DL or Bchn. To secure data, the system grows new branch cells on the DL or Bchn or new stem cells on the DL or Bchn. Other than responding to the attack detector, the system may use the AISO to add new data to the DL or Bchn as explained above in connection with the attack response module.

The system and method can protect personal data and/or sensitive corporate data as randomly stored critical data and release that data, by a reconstruction module, only with personal authorization or corporate authorization. In handling secured critical data in the DL or Bchn, the nonsensical data is randomly stored in the Bchn and DL based upon a nonsensical initial state function which function is inferior to the critical data function. Various additional processes include: (i) supplementing data by conducting automatic information search operations (AISO) through data collections using segments of the critical data to obtain supplemental data, linking the supplemental data to the segments of critical data, and storing the linked supplemental data randomly in the DL or Bchn based upon a predetermined supplementation initial state function; (ii) forking a series of branch cells off a series of stem cells in the respective DL or Bchn, wherein the forking is determined by a predetermined forking initial state function which is different than the critical data initial state function, resulting in the growth of new branch cells based upon a new growth initial state function; (iii) growing new growth stem cells with a new stem growth initial state function; (iv) linking two DLS together or two Bchns together with a respective linking initial state function; (v) resetting critical data earlier stored in the DL/Bchn by copying the critical data, randomly storing the copied data in another set of random cells in the DL/Bchn based upon a predetermined resetting initial state function; and, (vi) resetting with follow-on extinguishment of critical data by first copying the data, second randomly storing the copied data in random DL/Bchn cells, and third extinguishing or deleting the original critical data from the DL/Bchn based upon a predetermined reset plus extinguish initial state function.

After securing critical data as discussed above in the DL/Bchns, the system can retrieve and reconstruct the critical data in its original state if the requester has the appropriate authorization. The DL/Bchn has cells with cellular immutability and cellular connectivity. The system retrieves and reconstructs the critical data by extracting the randomly stored critical data using the critical data function. To monetize critical data and critical data that has been supplemented with the AISO, one the system has an indication of payment, the system either (a) retrieves, reconstructs and presents the critical data to the authorized Rqtr by extracting the randomly stored critical data using the critical data function, or (b) retrieves, reconstructs and presents the critical data function plus the supplemental data using the critical data function and the supplementation function.

In another embodiment of the present invention, the system secures critical data and retrieves critical data in and from a computer memory. This computer memory includes memory cells wherein a subset of these memory cells are linked together by a cellular connectivity characteristic and a cellular immutability characteristic, called "LMCs" or "linked memory cells." The system randomly stores critical data in random cells of the LMC using a predetermined critical data initial state function. Also, the system stores nonsensical data in other cells in the LMC, other than the random cells holding the critical data using a nonsensical initial state function which is inferior to the critical data function. The system is enabled to retrieve and reconstruct the critical data by extracting the randomly stored critical data from the LMC using the critical data function. The system also forks, branches, permits stem cell growth and branch cell growth, uses the AISO to locate and supplement the critical data (also randomly storing the supplemental data in the LMC) as described earlier with the Bchn and DL data constructs. The responsive attack module and pre- and post cyber attack feature described above are implemented in the LMC.

An additional implementation of the invention using LMCs uses a data storage diaspora (DSD) formed by a plurality of LMCs. Critical data is randomly stored in the DSD to form exiled data using the predetermined critical data initial state function. The system also randomly stores nonsensical data in other cells, other than the random cells, in the LMC, based upon a nonsensical initial state function which is inferior to the critical data function. Retrieval and reconstruction of the critical data is provided for by extracting the randomly stored critical data from the LCM using the critical data function from the DSD, thereby maintaining a provenance, an authenticity, an originality, and a source of the critical data. Supplementing the critical data uses the AISO operations as discussed above for supplemental data, linked to the critical data, and then randomly stored in the LCM based upon a predetermined supplementation initial state function. Upon accepting an indication of payment, the system either (a) retrieves, reconstructs and presents the critical data to the authorized Rqtr by extracting the randomly stored critical data using the critical data function, or (b) retrieves, reconstructs and presents the critical data function plus the supplemental data using the critical data function and the supplementation function.

Although the invention is illustrated and described herein as embodied in a multi-modal, modular data security and monetization system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified terms such as "first", "second", "third" and so on are only used for descriptive purposes, and cannot be construed as indicating or implying relative importance. In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. The terms "program," "software application," "application," and the like as used herein, are defined as a sequence of instructions designed for execution on a computer system. A "program," "computer program," or "software application" or "application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
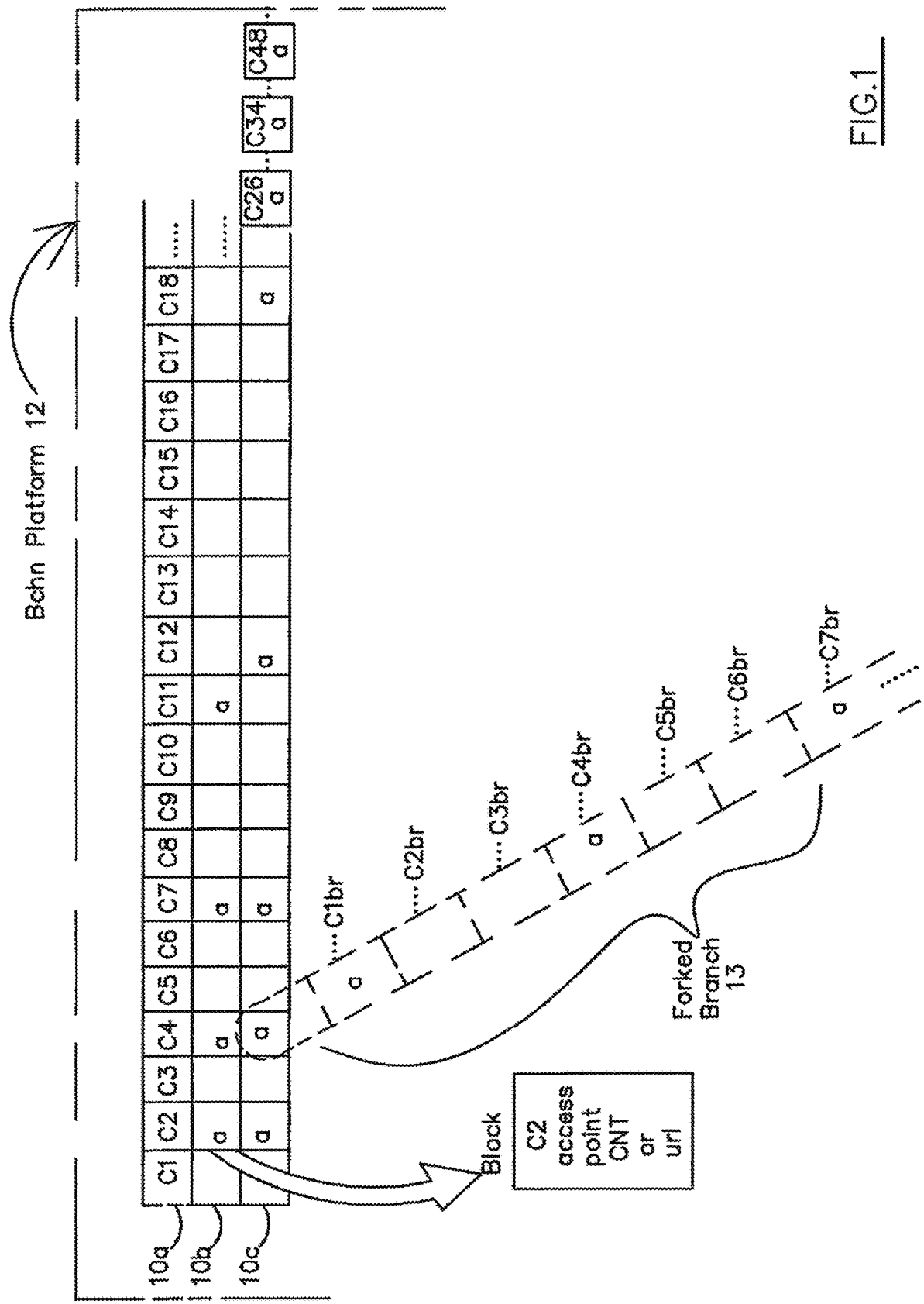
FIG. 1 diagrammatically illustrates a blockchain ("Bchn") on a blockchain platform.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention relates to a multi-modal, modular data security and monetization system and method (the MMM system and method) utilizing unique data security concepts and processes. The MMM system and process also includes, in some embodiments, a monetization platform for the sale, license or commercial distribution of packets of data (data outputs) to interested persons or entities. The MMM system and method not only secures and assures the secrecy of a data object or document but also enable the user or sys-admin to enhance captured data by adding relevant add-on data to the original data object/document. Persons interested in the document's subject matter may pay for access to the enhanced data object or document. Therefore, the MMM system and process can be configured to monetize a data output.

There are several important aspects, of the many important aspects, of the present invention, which form the basis of the present inventive multi-modal, modular data security and monetization system and method ("MMM" system/method). First, data should be extracted (forming exiled data or "exiles") and then distributed to secure data stores or storage facilities (forming data "diasporas" or "data store diasporas" (DSD)), with the view that exiled data has an origin and a provenance (authenticity, characteristics of originality, and source), so that the original source document or data stream (forming a type of data "promised land") (these original source documents or data streams sometimes referred to as OSD) can be reconstructed under security protocols. Once reconstructed, the user (a person, a corporate entity or government entity) can determine (a) to maintain security controls over the data (as well as enhance such controls based upon risk assessments) or (b) release some or all of the reconstructed data (a recon data function) in an effort to monetize the recon data.

The source data or OSD encompasses all forms of electronic digital communicative inputs and characteristics, including, without limitation, textual data or documents (structured or unstructured), data objects, imagery, sound, AV, author/editor identification data, content accuracy data (e.g., in the form of a hash value), and all underlying meta data. Sometimes herein source data is referred to as a "source document" or OSD which encompasses all forms of digital data with electronic characteristics and other meta data present in the source doc or source data stream. These data elements are also included in the definition of "critical data." The data stream similarly embodies all forms of electronic characteristics in addition to flow characteristics (time data (transmission and/or reception), start or stream initiation data, end or stream termination data, and possibly derivatives such as velocity and acceleration data).

This "source data" OSD includes all of the aforementioned data input into the MMM system and method. OSD may be enhanced to include, but is not limited to, all electronic data interactions by a "subject" (that subject being a person, corporate entity or government entity using the MMM system or process as explained below), and communicatively coupled data source generator. Sometimes herein the "subject" is a corporate or government enterprise. Communicatively coupled data source OSD generators (OSD Gens) include, without limitation, all types of data sources including, among other things, online data collections (search engines, vendors, providers, libraries, or any other entities generating data upon the request of the subject), online platforms selling or offering to sell goods or services, ad networks, email systems (such systems delivering email from a sender (an email doc)), wearable sensors carried on the subject's body sending data about the subject's condition (for example, an APPLE™ watch, or biometric-producing clothing), and an artificial intelligence or AI system producing data. The subject need not request the incoming source data but the subject's electronic device or system generating the source data or source doc or OSD may automatically send and input OSD into the mmm machine data. For example, source data OSD is sometimes pushed to a person's cell phone. This is especially true with biometric generating wearables. Source data has an informatic value.

Another important aspect, of the several important aspects, of the present invention is the employment of automatic information search operations AISO wherein the informatic value of the initially input source data OSD is enhanced, automatically and, at times, constantly. AISO is distinct from artificial intelligence AI engines or module, although the AISO module may use an AI module as part of the gathering of supplemental data SuppleD. The resultant data, a combination of the OSD and the SuppleD, is an expanded or enhanced version of the source data or doc OSD+ or OSDsupple, forming a type of "living document." The NON-Supplemented OSD may be segmented and stored in different data stores DSDs as OSDseg1, OSDseg2, OSDseg3. If multiple rounds of AISO operate on the entirety of the OSD (pre-segmentation) or segments of the OSD (OSDseg1, OSDseg2, OSDseg3, et seq.), the resultant from the ALSO operations is ODS+2, +3, +4 (representing two, three or four rounds of AISO) or, for segments, OSDsupple1+2 (two AISO on segment 1), OSDsupple1+3 (three AISO on segment 1), OSDseg1+4, OSDseg2+2 (two AISO on segment 2), OSDseg2+3, OSDseg2+4, et seq.

The informatic value of data has characteristics involving time, scarcity, data origin or provenance, intrinsic and external or extrinsic value to others who do not have the data. The term "intrinsic" refers to and is defines as the informatic value of the OSD to the owner or possessor of the OSD, whereas the term "extrinsic" refers to the informatic value to others who are not the owner or possessor of the OSD.

In connection with personal data privacy ("PDP"), one example of source data OSD having a high intrinsic value is heart condition source data from a subject's wearable device indicating a bad heart condition. That same heart condition data has extrinsic value to the subject's physician and the electronically connected healthcare (HC) provider system. The extrinsic informatic data value to the HC provider is based upon potential services to be delivered to the subject on a timely basis to enhance the potential of the subject's recovery from the bad heart condition which condition was timely detected by the wearable. In this example, the intrinsic informatic value (IIV) of the source data incrementally diminishes from the data acquisition time to a follow-on time period (for example, a 15 minute to 6 hours timeframe) and the extrinsic informatic value (EIV) initially diminishes over that same time period, but then, when the subject finally communicatively engages with the physician or HC, the EIV becomes more valuable to the HC and/or physician because he or she needs the as-captured and stored source data OSD as a diagnostic tool for further treatment of the subject. The higher extrinsic informatic value is initially high for a short period of time (approximately 30 minutes) because, in that short period of time, if the HC system were contacted and EMT professionals were dispatched to the subject's location, the HC system could provide medical services greatly improving the subject's health.

In other situations, the initial intrinsic informatic value of source data is low, but then increases over time. For example, a person-subject searching for shoes to buy may collect some data in search 1 at time t1 (Sch-t1), and later in search 2 at t2 (Sch-t2), but not make a purchasing decision at t1 or t2. The extrinsic informatic value at t1 to shoe vendors and to the ad network is low. At t2, the extrinsic value increases because the subject has shown consistent interest in looking at shoes and potentially purchasing shoes. Further searches for shoes over, for example, a 2 week period, indicates a high degree of EIV to shoe vendors and to the ad network which displays shoe advertisements to the person—subject.

The personal data profile PDP intrinsic informatic value (PDP-IIV) of passwords or access codes controlled by the person-subject has a high intrinsic and extrinsic informatic value although this extrinsic value is high only to bad actors and thieves.

Passwords and access controls have high intrinsic and extrinsic informatic values based on scarcity (only the person-subject has the password), data origin or provenance (knowledge and ownership by the person-subject). The intrinsic value is based upon what the person-subject can do with the password (access his or her back account, pay bills, buy a car, sell assets such as stock bonds and cryptocurrency). Corporate entities (explained below) have trade secrets, such as formulas to make products (e.g., the formula for COCA-COLA®) which have high intrinsic and extrinsic informatic values based primarily on scarcity. By definition, other corporate and governmental entities do not know the trade secret.

Some corporate entities have unique business models that initially have high intrinsic and extrinsic informatic values but their extrinsic value diminishes over time once the business model is copied by others. See, for example, the SEARS® 1888 mail order catalog business (halted in the 1990s) compared to Land's End® mail order clothing catalog (currently a vibrant mail order clothing manufacturer). Scarcity is correlated with the release of source data OSD to others. High levels of data security, in general, increase the scarcity value of the data.

Informatic value (IIV and EIV) can increase organically (continual collection of a person-subject's browser search history) or deliberately by applying contextual analytics to the source data and adding information to the source data. This methodology is the concept of AISO and OSDsupple (OSD+).

However, adding information to the source data may require electronic communication with outside data sources which inherently increases the risk and the data security of the source data. The AISO may also work with internal or secure data bases and data collections. If there are big security risks, then automatic information search operations AISO may not be activated in connection with the original source document but an expanded knowledge document stored in remote distributed storage locations, such as data store diasporas (DSD). Therefore, the MMM system and method employs a layered approach to (1) data gatherings AISO and (2) attack defense modules or antihacking detection modules. The result is automatic control of data collection and data enhancement of the source data via AISO.

Ultimately, the results will start with the base original document as OSD+, OSD+2, etc., when there is no risk of attack, risk of search detection, or if those risks are low. In this manner, the layered attack-defense modules (LAD modules) are activated as needed. If the OSD has a high informatic value, the layered attack-defense modules may be activated ON continually to assure that in the event of an attack, virus intrusion or hack, the OSD segments (OSDseg1, et seq.) may be further segmented and disbursed to secondary and tertiary DSDs.

The original base document OSD becomes a "living document" when infused with new content supplied by the automatic information searches operations AISOs.

Optionally, classification of content elements in the OSD document may be changed based on the added Supple information, that is, OSDseg+, OSDseg1+2, OSDseg1+3, OSDseg1+4; OSDseg+, OSDseg2+2, OSDseg2+3, OSDseg2+4, et seq.

When under attack or subjected to a high risk event, the MMM system and method provides a "formless" document/system with diverse and distributed data stores, DSD. The communication channels leading to and from the DSD and the OSDseg+, OSDseg1+2, etc., such as the internet or internal secure comm channels, are also monitored by the LAD modules prior to, during and subsequent to the data transfer DTXR event. If the attacker electronically sees or monitors these operations and if the DSD storing the OSDseg+ is not totally formlessness, then the attacker encounters a puzzle where most of the OSD pieces are missing.

One application of the MMM system and method is enhancement of more personal data privacy PDP and more corporate data privacy CDP. At some level, the discussion of "personal data privacy" (PDP) is similar to corporate data privacy. On a personal level, the person or personal user engages various electronic devices to look for products and services, gather information about those goods and services, then purchases goods and services as needed. This subject person uses cell phones, tablets and computers to interact with the world. Advertisers need to engage with potential customers. Hence, an ad network captures the personal user's activities, feeds this data back to seller so the seller can advertise its goods and services to the subject person. The ad network feeds ads to potential consumers based upon their likes, and sometimes dislikes. Ads pushed to consumers from the ad network are paid for by the companies selling goods and services.

Since the MMM tools presented in the present invention can be deployed on a personal level, then more broadly deployed on a corporate level, and finally used by governmental bodies, the application of the present tools, methods and modules are discussed on a personal level. However, as explained above, these same tools, methods and modules can be applied to both corporations and governmental bodies. The term "subject" refers to and is defined as persons, corporations, business organizations and governmental bodies.

On a personal or individual data privacy level, the ad network generally collects enormous amount of data on the consumer user. The ad network is generally defined as a technology platform that mediates the sales of ad inventory between publishers and advertisers. It is a term used exclusively for digital media and online ads. One view is that the ad network as a broker of sorts, collecting an enormous volume of impressions from publishers and then putting them up for sale to advertisers. An ad network is part of advertising technology or adtech that is widely used in today's digital media trading market. Most publishers put up their ad space for sale, and look for ad networks to secure buyers. Similarly, advertisers visit ad networks to find the most suitable inventory for their needs.

At the corporate level, the corporation acts as a business consumer in a similar manner, looking for goods and services it needs, exploring the electronic network or internet, gathering information, and making purchasing decisions. However, in contrast to the personal user discussed above, the corporation (or other entity, such as a partnership, LLC or other for-profit or non-profit entity, referred to and is defined as herein as "corporate" users or "corporation"), has a defined output or outputs, selling goods or services to other businesses or to personal consumers. Therefore, the corporation has "corporate data privacy" CDP issues similar to the consumer's PDP. However, corporations typically refer to its CDP as trade secrets and attempt to maintain that CDP data in a secret manner so that the corporation's competitors cannot ascertain or discover the corporation's systems and methods. It is believed that many corporations do not recognize the value of CDP and the need to closely monitor data flows and employ data gathering tools to enhance corporate operations. The present invention enables these corporate organizations to better control, disperse and monetize (if they wish) CDP data.

Another differentiating aspect between personal consumer users and corporate organizations is that corporations typically have more individuals, divisions or segmented operations, generating different goods and services. Each division or segmented operation may have different data security needs and different monetization models. As a result, corporate implementation of the security and monetization tools discussed herein are more complex and may require a hierarchical approach to implementing the MMM tools. Upper management in a diversified corporate structure can mediate different, conflicting internal security and monetization wants and needs between different divisions and business segments under the control of a single corporate governing body.

In connection with governmental bodies, the present MMM tools, objectives and benefits can be used. Governmental bodies at a high level also act as consumers and businesses by providing services (for example, criminal justice services to imprison convicts) and goods, such as roads, sewers, etc. which benefit the general public. Sometimes governmental bodies are viewed as being in the "business of government." Therefore, references to "corporations" and corporate activities apply equally to governmental organizations. In contrast to persons who wish to control PDP data and corporate entities who wish to control CDP data, at some level governmental bodies have a transparent data policy. However, a governmental body's concept of data transparency generally only applies to the final decision to implement, control and deliver the governmental services and governmental goods. Most governmental entities want to keep their buying habits and internal decision-making processes secret. The concept that internal discussions within a governmental body are secret is based upon two foundations. First, the governmental body needs to gather information craft output proposals to match its governmental goals and policies, and when two or more outputs present the best match to the goals or objectives, then the top level governing body openly discusses these output options and makes a final decision to purchase goods and services from vendors and to deliver government goods and services to its constituents. Again, the MMM tools and methods discussed herein can be applied to these governmental bodies. Certain information inputs may be initially maintained as secret. Competing views of the inputs and governmental objectives, may also be initially maintained as a secret. As for the monetization tools discussed herein, the government entity may not wish to employ those tools, in a similar manner to a person who decides not to sell or licensed his or her PDP data. However, the tools discussed herein may be used by the governmental body or entity to perform audits which enable the body to better serve its constituents (GAudits).

The one of the several solutions offered by the present invention is to (a) automatically extract and then distribute the personal privacy data PDP into widely disbursed data stores, a network of data stores forming a DSD, and then, when activated by the user-permission holder, to reconstruct the privacy profile PDP of the user. With the reconstruction, the user can view, respond and respect his or her own privacy profile.

A further solution offered by the present MMM invention is to enable the user to see his or her privacy profile and then re-set his or her own privacy controls, thereby enabling further extraction, disbursement and potential reconstruction of the personal data profile (PDP). Of course, with the reconstructed PDP, the user may, if he or she wishes, sell or license the PDP to others. In this manner, the person obtains the PDP data, collects the same, stores the same in dispersed locations, alters the privacy controls on the person's electronic devices, views the person's PDP as an entire document or dossier, and then can monetize the reconstructed document or doc.

Innovation and inventiveness of this MMM system and method is transforming the historical blueprint and formula of the Old Testament of 3,500 years ago and how history followed that blueprint into a formula for survivability and success of historic content and data in the digital ecosystem. The long-term objective of data 3,500 years ago involved the return of original source data OSD from different geographic or territorial "diasporas" to the original "promised land." The OSD being the Old Testament and related documents. The formula and process succeeded in transferring this historic data to the present day in the historic geographic or territorial homeland. The identity of the people studying this historic data and the yearning to return to the homeland by peoples subject to diasporas were maintained for thousands of years. This yearning to return to the promised land resulted in the homeland being populated as a state nation member as part of the larger ecosystem of nation states. This methodology broadly describes a 3500 year "survivability" formula, and the ultimate "success" formula for the people subject to diasporas, survival of the OSD, and renewal of the homeland.

Regarding the success formula, in the promised land, it is written that humans will enjoy natural growth of food with no need to work. The MMM system and method emulates this by integrating automatic information searches operations AISOs which will lead at one point for automated creation of wealth. Some aspects of the present invention are based on theories found in Old Testament book of Deuteronomy 6,8 which focuses on the return to the Promised Land promised to Abraham, Isik and Jacob in the book of Genesis. Historic research indicates that the core of the Old Testament is about a covenant to give the Promised Land to a certain tribe or group of persons. Warnings are found in the Book that if the people do not keep the rules set forth in the Book, they will lose the land. The parallel concept in computer security is not adhering to and keeping basic security rules for OSD. The failure to adhere to the basic security rules results in security breaches and ransomware attacks, among other things. Incomplete and non-dynamic security systems result in a loss of original source data OSD, which represents the Promised Land. Even if prior art data security systems employed high degree of distributed data dispersion, unless the data security system adheres to a course set of data security rules, the owner or possessor of the OSD will lose the ability to recover the OSD. In contrast, the MMM system and method generally following data dispersal methodologies represented by dispersion in data store diasporas representing exiled data for significant periods of time permits the owner or possessor, whether a person or a corporation, to reconstruct the OSD and return the OSD similar to the return back to the Promised Land.

The MMM methods and systems can be implemented by IT consultants to the benefit of companies, corporations and governmental bodies. The MMM is also a training service to IT consultants on how to secure data by dispersal and reconstruction methodologies integrated with creation of added supplemental data created by automatic information searches operations, AISOs. The MMM methods and system also disclose how to build it and use the data.

Another objective of the MMM system and method is to provide updated content for added value and also to add more AI machine understanding of nature of OSD content. As described above, the OSD is subjected to segmentation and data store diasporas DSD in order to enhance data security. Added content is provided by automated information search operations carried out by AISO modules, ODS+ 2, +3, +4 (representing two, three or four rounds of AISO). The AISOs may be employed prior to data storage DSD or subsequent to such storage. Multiple AISOs on data segments (OSDseg1; OSDseg 2; etc.) first generate OSDseg1+; OSDseg 2+; then subsequently OSDseg1+2 (two AISOs on segment 1) and OSDseg1+3 (three AISOs on that segment). Segmenting OSD and storing segments into different, dispersed data stores is discussed in U.S. Pat. No. 9,015,301, the contents of which is incorporated herein by reference thereto. See generally FIGS. 5, 30, 32, 48 and other figures and the related text. Reconstruction of the OSD from the OSD segments (OSDseg1; OSDseg 2; etc.) is generally shown in FIGS. 7, 10 and in other figures and in the related text.

FIGS. 1a and 1b in U.S. Pat. No. 9,015,301 (the '301 patent) diagrammatically illustrate an information infrastructure which is a dynamic process. The information infrastructure includes a number of modules, process routines or functions for the source document or source information file OSD. First, the OSD is processed via an editor module to deconstruct the source doc into its constituent parts. After deconstruction, the infrastructure processes data with an extraction module which segments the OSD. Segmented data, sometimes called extracted data in contrast to remainder data (data remaining in the stripped-down OSD), is sometimes processed into secure storage modules. The OSDseg1, OSDseg2, OSDseg3, etc. are sent to dispersed data stores, DSD. As an example of a simple content module operating as a content filter, processing a highly classified OSD top secret "TS" document, having earlier identified and known TS words, other secret "S" words, phrases and data objects, confidential "C" words, and non-confidential "NC" words, the TS words and the C words are segmented by the content filter, leaving the stripped-down doc or remainder doc with only NC words. The TS words, either as a group or individually, are stored as the OSD segments. The same is true, in this simple system, for the S and C words. The OSDseg1, OSDseg2, and OSDseg3 are sent to differentiated data stores in the DSD system.

The '301 patent also discusses a knowledge expander configuration, wherein the OSD is first segmented by a content filter, then processed through an expansive or additive content filter which adds similar words and synonyms. For example, TSsyn is a similar word or synonym to TS. The OSD is then run through the content filter again to identify both TS and TSsyn words. This expanded set of segmented words is then stored in the DSD.

Segments in the '301 patent are also applied to contextual filters or contextual modules and taxonomic filters or taxonomic modules (CCT operations). Content filters/modules identify, in general, similar words and synonyms. Contextual filters/modules apply contextual rules which may include association of a certain defined word TS (see content filter/module discussion) to other words in the sentence, in a word count, or letter count phrase, a paragraph, or other defined relationship within the OSD as a whole. Contextual analysis includes semantic analysis and semiotic (signs and symbols) analysis. Specifically, the internal format of content information is important to its regulation, interpretation and the further use and application of the information. The key word (e.g., TS) is searched in context with other associated words. The contextual filter/module also identifies semiotic (words and objects in language) and pragmatic (words relationship to the user or creator) meaning. The contextual filter/module also assesses relevancy of the identified content (e.g., TS) in relationship with other content (e.g., s, C and NC) in the OSD. Relevancy is a type of sensitivity. The taxonomic module identifies the category or categories of the key word content (TS and/or S, C or NC), such as hierarchical taxonomic classes. Words in those higher or lower taxonomic classes are then either used to filter out more words in the OSD or to add words to the OSDseg as needed (OSDseg Supple) to expand the intrinsic informatic value (IIV) or extrinsic informatic value (EIV) of the disassociated or separated OSD. Therefore, these content, contextual and taxonomic filter/modules can be used to either extract important words or phrases from the OSD, used to identify equally or closely related important words or phrases in the OSD and then extract those equally or closely related important words. All this with the view to strip out TS, personal data privacy PDP or corporate data privacy CDP from the OSD.

Alternatively, these content, contextual and taxonomic filter/modules (CCT) can be used in a knowledge expander system or process (see the '301 patent) to identify primary and secondary search terms and locate supplemental additive data SuppleD from communicatively coupled data source OSD generators (OSD Gens) data collections (search engines, data bases, etc.) These search engines operating in conjunction with data bases or data collections are OSD Gens.

An extraction module in the '301 patent handles input from content filter/module, contextual filter/module and taxonomic filter/module. Since the extraction is employed with the (a) security system and (b) the knowledge expander KE system to generate select content like TS data, this dual purpose both feeds OSD data to the filter/modules and accepts data therefrom to define the filters used to extract critical data TS, S, C and NC from the OSD data flow. In the security system, the content, contextual and taxonomic filter/modules (CCT filter/modules) act as filters. In the initial phase of the knowledge expander KE system and method, the CCT filter/modules first identifies "filtered" or "extracted" data from OSD and assigns them as search terms. If the KE system is set as an expander, these search terms are applied to OSD Gens (e.g., other data bases) and the resultant from the search represents SuppleD1 at search Sch-t1 (time 1), and a second search Sch-t2 as SuppleD2, etc. The SuppleD1 and D2 can be related in some organized manner to the OSD, such as in the form of footnotes or end notes. Other document indicators or taxonomic relators may be employed to integrate the SuppleD1, D2 into or associated with the key search terms. The OSD can then be referred to as OSD-SuppleD1,2.

Although "words" are discussed herein in connection with TS, S, C and NC, that subset of data may be select words/data or security sensitive words/data or any important data, data object, or meta data in the OSD. The term "word" as used herein is meant to encompass, as part of its definition, any data object or meta data, secret (TS, S, C), non-secret (NC), and common words (the, a, and, an, etc.).

When configured as a knowledge expander KE infrastructure for select content such as TS/C, contextual filters increase the OSD data set (referred to as OSD-SuppleD1, 2) based on extracted data from the source doc. OSD-SuppleD1,2 may have an increased informatic value IIV and EIV when combined with informational content of OSD Gens data stores. The information infrastructure in the '301 patent may use an existing taxonomic classification system or an information policy, a ruled-based system, or may have no pre-existing classification system. The infrastructure process includes a classification generator module or taxonomic module which employs a select word TS/C extractor, a KE search engine to generate additional supplemental documents (SuppleD) which the sys-admin may use the create the hierarchical taxonomic classification system. Otherwise, the sys-admin may purchase taxonomic classifications commercially from others. However, the sys-admin must ultimately prioritize the hierarchical taxonomic for the corporate or government enterprise. The KE expander module can be configured to list docs and data entries and this listing can be used by the sys-admin to (a) build the hierarchical taxonomic and (b) prioritize the classes in the taxonomic or tax module. Once the hierarchical taxonomic classes are gathered, the sys-admin defines which tree, branch and leaf is critical in tax classification generator module, then defines (or redefines) security/importance levels, for example TS vs. S vs. C vs. NC, selects secure stores in the DSD, identifies other important select content or security sensitive words or phrases, and sets access/distribution permission levels, service levels, access levels and other policies for the enterprise which policies are translated into a rules-based system for the processing of OSD data.

Returning to the present inventive MMM system and method, while in DSD distributed storage locations, the MMM system and method can engage in continuous SuppleD content production operations, running 7/24, in order to: (a) update the initial base document/data stream OSD with updated content (OSD-SuppleD1,2) to improve autonomous content control (which is either a data security system Doc-Sec-Sys or a knowledge expander KE system); and (b) create added value IIV and EIV by adding content with high added value through specialized search operations at Sch-t1, Sch-t2. In the KE system, the added value content CNT or SuppleD can be re-sold to external operations based upon the external informatic value (EIV).

Further details explaining how to identify the IIV and EIV of SuppleD is found in U.S. Pat. No. 11,461,785, entitled "System and Method to Identify, Classify and Monetize Information as an Intangible Asset and a Production Model Based Thereon" (the '785 patent), the content of which is incorporated herein by reference thereto. The '785 patent discloses the use of dispersed storage locations DSD and automated content search tools used to generate (i) expanded or supplemental search terms via content, context and hierarchical ("CCH," herein referred to and defined as "CCT") processes and then (ii) another search is done with the supplemental search terms for second additive content, SuppleD2. To narrow the search, the '785 system uses CCH/CCT and limit search control parameters to a pre-set quantity of hits in the OSD Gens or time-out for limiting search through the OSD Gens. As explained in the '785 patent, the KE engine may also be used to refine or contract OSD-SuppleD1,2 by running that OSD expanded data set through the CCH or CCT filter/modules, and then removing some of the extracted/identified terms and data from the OSD enhanced data set, resulting in OSD-SuppleD1,2-Edit.

The new MMM system and method paradigm includes, among other things: (a) computer network with automated documentation ("acknowledgment") of the content CNT within the documents/data streams through content classification and categorization. This acknowledgment is defined as the output of the CCT filter/modules and the controlled application of the CCH/CCT or CCT processes. Current systems and methods only identify a low percentage of the content which is then classified and categorized. The MMM system and method provides much higher levels of classification and categorization.

The new MMM system and method paradigm also includes, among other things: subsequently splitting the acknowledged content CNT in the OSD document/data streams into content pieces or segments as the output of the CCT filter/modules. The MMM system and process also distributes those CNT content pieces or data segments to different remote storage locations DSD, thereby permitting the user or system administrator (sys-admin) to apply a "copy permitted" tag or note on the stored CNT data segment(s) or apply an "extraction" tag on this CNT data segment. With an extract tag, this SuppleD is stored in a different data store in the DSD, and, in some manner, the relational map-to-OSD-CNT is stored in another data store in the DSD.

One important aspect, of the several important aspects, of the present MMM system and process may require strict adherence to new processes. This strict adherence to the process establishes a formless eco system which is the foundation of its success. The processes may include, among other things, (1) mapping of locations of OSDseg content stores by use of DLT distributed ledger technology (a distributed ledger or "DL") or its subset, blockchain Bchn data structures, or linked memory cell systems, LMCs. For example, the use of ZKA zero knowledge authentication between DLT or blockchain or LMC cells reduces the possibility of leakage of password or access control data during OSD segmentation and/or OSD-SuppleD1,2 data reconstruction operations. The MMM system and processes also include, among other features and functions, (2) regulated continuous search operations, and (3) defining requested final results from the content operation. In other words, a request for specific automated content processing results on a specific subject that translate into additional new added value which can be valued economically by currency or other stores of value. Virtual currency is one type of identifiable store of value that can be used to exchange EIV SuppleD or segments of the OSD-SuppleD1,2 to another party. Also, the owner/possessor of SuppleD or segments of the OSD-SuppleD1,2 may exchange those data sets for other data sets which the owner/possessor believes has EIV to him or her. In some sense, this is the economic basis for joint ventures between corporate entities.

It should be noted that although many of the functional aspects of the MMM system and process are described herein as being implemented on a "blockchain" ("Bchn"), these same systems and processes can be implemented on a distributed ledger using distributed ledger technology (a DLT system and process) and LMCs, linked memory cells.

All functions discussed in connection with the Bchn can be implemented on the DL or distributed ledger and LMCs. A Bchn is a technologic subset of a distributed ledger ("DL") using specially configured DLT. Bchn and DL and LMC can be programmed to (a) provide secure data provenance; (b) assure data authenticity; (c) enable data forensics to uncover malware or other virus intrusions; (d) maintain security of data for both personal, corporate and governmental privacy; (e) protect data against theft or data manipulation; (f) provide tamper-resistant records; and (g) provide an effective tool for verification of "access identity" information for persons or systems seeking to gather secret data, and select data. Secret data and select data is referred to herein and defined as part of the "critical data" processed by the Bchn, DL and linked memory cell data constructs. The DLT system and process can include the immutability characteristic found in blockchain systems. The DLT system can implement algorithmic links between DL platforms and DL cell-to-cell connectivity so that the connectivity equations (the algorithmic links) provide distinct functions. Bchns are a subset of DLs when the DL has both (i) a data cell immutability characteristic, and (b) cell-to-cell connectivity and, more broadly, platformA/cell-to-platformB/cell connectivity. See FIG. 4 for the multi-platform embodiment. Therefore, all functional discussions of Bchns herein apply equally to a DL or a series of DLs having cellular immutability and cellular connectivity.

Prior art DLT systems have been proposed to connect international banking DL ledgers, however, the technical details of such systems have not been described. Conceptually, the proposed system provides: (a) AML (anti-money laundering tracking) and KYC (know your customer) utility functions between distinct bank transaction ledgers; (b) commentators think the DLs can be tamper-resistant, auditable, and resistant to systemic failures; (c) systems to detect and mitigate fraud; (d) secure data provenance, for data authenticity, forensics, and privacy; (e) systems to enhance privacy, and verification of identity information. However, the prior art fails to describe any technologic solutions to achieve these aspirational objectives. The present MMM system and process provides technologic solutions to achieve these aspirational objectives.

In a similar sense, the Bchns and the DLs (these DLs having cellular connectivity and cellular immutability) and LMCs operate on and can be generally defined as blocks or segments of computer memory. These LMC systems include a plurality of memory cells (see FIG. 1, cells C1-C18) on a platform or a massively scalable object data store or "MSODS." The functions and routines discussed herein can be configured as one or more virtual machines (VM) interoperably connected and operable on the MSODS. A subset of this plurality of memory cells or LMCs can be linked together so that each cell of the subset of computer cells has a cellular connectivity characteristic. This subset of LMCs is defined herein as and LMC block or LMC-blk. Further, this subset of memory cells LMC-blk has a cellular immutability characteristic. This LMC subset of memory cells, with a cellular connectivity characteristic and a cellular immutability characteristic are called and defined as "linked memory cells." Considering NFTs, as a subset of blockchain, the NFT cells have a cellular connectivity characteristic using each cell's hash value to link one cell to another cell (the "cell" being a "token" in the NFT). The reference to blockchain herein refers to a system which may or may not use cellular hash values to establish the cellular connectivity characteristic. However, all references to blockchain (Bchn) herein assume that the chain has a cellular connectivity characteristic. The "linked memory cells," as defined and discussed herein, all have a cellular connectivity characteristic and a cellular immutability characteristic.

Enhanced Document Security System or Process: the Doc-Sec-Sys. The principles of a formless structure involve a formless content (CNT) machine to segment CNT and buildout the data structures, store critical CNT data therein, establish security protocols to limit reconstruction of the critical data, and permit reconstruction by authorized users. The formless machine splits an OSD document or splits an OSD data stream into different content pieces with CCT filter/modules and enabling the continuing dispersal into DSD data stores and follow-on reconstruction functions of the related to the document, data stream from the dispersed storage locations. The MMM system and process can be configured as a virtual machine (VM) to run programs and deploy apps. One or more virtual "guest" machines run on a physical "host" machine. The techniques for extraction (explained in the '301 and '785 patents), and the use of the inventive elements of embedded automated programs in the DLT or blockchain or LMC add randomness to the data store operations to distribute data into cells of different data stores in the DSD.

Formless Technology: DLT distributed ledger technology, and the more common blockchain ("Bchn") technology, acts as a map, to locate extracted data (the DLT or Bchn carries the map segment or link) and, by clearance of the owner/possessing party or Requestor ("Rqtr") seeking a reconstruction operation, the reversed of the ultimate order of extraction. The same is true for the LMC data construct. The result is a full or partial reconstructed OSD or OSDsupple (or segments thereof). There may be some security risk relative to the platform maintaining the DL or Bchn however the use of randomizing functions to locate cells in a particular DL or Bchn branch establishes the formless and effective randomness of the formless MMM system and process obscuring the critical data content CNT within the formless data structures. If the DL or Bchn or LMC (linked memory cells) data constructs are deployed on the massive data storage MSODS, using VM to execute the functions discussed herein (see FIG. 3 for such platforms or data constructs), good practice data security protocols should be imposed on these Bchn/DL/LMC platforms or the MSODS system. The several data structures to either store OSDseg1, 2, 3 (three OSD data segments) or store access points pointing to secure data store locations are discussed herein for the MMM system. For example, in connection with FIG. 1, an access point "a" may be a url wherein the url points to the secured data store location in off-chain data stores in the DSD (see FIG. 4). Otherwise, the critical content CNT may be stored on-chain in the blockchain, DL or LMC data structure.

FIG. 1 diagrammatically illustrates the use of a blockchains Bchns 10a, 10b, and 10c and, in connection with Bchn 10c, a forked Bchn branch 13 shown in dashed lines. Blockchain 10a has a number of cells C1 through C13. As noted herein, although extended discussions of functions and operations are discussed in connection with Bchns, all these features, functions, characteristics and processes can be implemented on DLs and LMCs. Therefore, although Bchn-based processes, modules and systems are extensively discussed, the invention defined in the claims is not limited to Bchns because these processes, modules and systems can be implemented on similarly configured DLs and LMCs. In FIG. 1, blockchain 10b also is shown with 13 marked cells but the chain can be grown to include more cells. Blockchain 10c shown in solid lines has 47 marked cells but is also subject to growth as explained herein. The dashed blockchain branch 13 forks off of Bchn 10c as discussed later.

The blockchain is maintained on platform 12 and, in the present example, the cells may be created based upon proof of stake (POS) on platform 12. Other algorithms or functions may be designed to generate and monitor added cellular growth. Highly secure platforms may employ different minting or cellular growth functions, other than POS or POW. As explained later in connection with FIG. 3, access to blockchains 10a. 10b, 10c is controlled either by blockchain security gateway 14 having a zero knowledge authentication ZKA protocol or blockchain security gateway 50 (FIG. 3) having a common password control or a multi-signature (multi-sig) or multiple access control passwords held by multiple parties. For example, a 3 level multi-sig requires 3 different passwords from 3 different persons or entities prior to permitting access to cell C1 in blockchain 10a. A single access or single password control gateway for the blockchains is possible.

Blockchain 10b is shown as having a similar cell count as blockchain 10a, but blockchain 10b has key access points "a" in cell positions C2, C4, C7, C11. Bchn 10a is provided only as a reference point for chains 10b and 10c. Blockchain 10c has an extended cell count beyond cell C13 and FIG. 1 shows "a" cells C2, C4, C7, C12, C18, C26, C35, and C46. Access "a" points lead to DSD data stores containing OSDseg1, 2, 3 and/or OSD-SuppleD1, 2, 3 and/or OSD-SuppleD1-Edit, 2, 3. In this limited universe of eight critical "a" information bearing cells, there may be (i) critical OSDseg data stored in the cells or (b) eight on-chain access points leading to OSDseg data on the Bchn 10c, or (c) eight access pointer urls leading or pointing to DSD data stores, each targeted data store holding critical data segments OSDseg1, 2, 3 (in three stores) and OSD-SuppleD1, 2, 3 (in three stores) and OSD-SuppleD1-Edit, 2 (in two stores). These access pointers are urls to the data stores in the DSD data store diaspora. Rather than have these specially designated "a" cells retain access pointer urls, the cells can contain the actual data segments, OSDseg1, 2, 3. The eight DSD data segments stored in the respective Bchn cells in Bchn 10b are, in this limited universe, data doc or data stream information OSDseg1, OSDseg 2, OSDseg 3, OSD-SuppleD1, OSD-SuppleD2, OSD-SuppleD3, OSD-SuppleD1-Edit, and OSD-SuppleD1-Edit 2 (eight data stores). In this manner, the Bchns act as the data stores forming the DSD.

One process for providing either (a) random storage of data in a particular blockchain cell or (b) random storage of access points "a" to DSD data stores is discussed below. The data may be stored "on-chain" as CNT content (see the exploded view of Bchn cell C2), and, in the above noted example, eight cells would contain the critical data. If the data is stored "off-chain", eight access points "a" have data indicating respective urls which urls have CNT. This critical data is stored in the designated eight Bchn cells in blockchain 10b or 10c. In the blockchain 10b, these access points are designated "a." Cells other than "a" data cells may have nonsensical data stored therein as described later. Other cells (not "a" nor nonsensical cells) may have (a) no or little data therein (other than the cellular linking data) or (b) common word data or (c) randomly generated data from the KE 62 process and system in FIG. 3.

There are a number of functions that can be used to identify critical "a" or useful cells in the blockchain in the structure. Persons of ordinary skill in the art recognize that DL/LMC technology can be configured in a similar manner to blockchain. The use of a blockchain is only exemplary nature. As an example of an initial state mathematical function which can identify critical blockchain cells, reference will be made to a simple mathematical factoring function. Assume that cell C2 is represented by Ci ("initial cell") in the following simple factoring function Ffunc. The initial states in Eq Ffnc 1 are Ci=C2 and Cmax=1000 (representing 1000 cells in Bchn 10$b$).

| Equation 1 Table |
| --- |
| Eq: Ffnc 1: Ci; Ci + 2; C2(value) + 3; C3(value) + 4; ... |
| Eq: Ffnc 1 initial state Ci = C2, "C2(value)" equals the value in the identified Cn cell, |
| Eq: Factor function "+n" is additive "1" incremented at each step (that is, 2, 3, 4, 5) |
| Eq: Ffnc 1 Resultant Critical Cells: C2, C4, C7, C11 ... |

The initial state of Eq Ffnc 1 is "2" designating the first critical cell as C2 in the factoring function Eq Ffnc 1 and the initial state formula is a factor+1 at each "a" cell identifier, Ci. The first "a" cell location value in the factoring series is Ci=C2 (the initial state factor cell location value being C2); the second "a" cell location value is computed as 2+2=C4; the third "a" value is computed as 4+3=C7; and the fourth "a" value is 7+4=C11. In order to determine critical or data/access point cells in blockchain 10$b$, the factoring equation Eq Ffnc 1 would continue to run generating several critical "a" blocks in the blockchain until a maximum cell count is achieved, capped at 1000 cells for Bchn 10$b$. A second simple factoring function Eq Ffnc 2 is shown below. Factoring function Ffnc 2 is employed to generate data stores/access points shown in Bchn 10$c$ (solid lines).

| Equation 2 Table |
| --- |
| Eq: Ffnc 2: Ci; Ci + 2; C2 + 3; C3 + 5; C4 + 6; C5 + 8; C6 + 9; C7 + 11; ... |
| Eq: Ffnc 2 initial state Ci = C2 and Cmax = C1000 |
| Eq: Factor additive factor function is 2, 3, 5, 6, 8, 9, 11, 13 ... |
| Eq: Resultant Critical "a" Cells: C2, C4, C7, C12, C18, C26, C35, C47 ... |

There are many mathematical functions that can be employed using initial state functions. FIG. 1, Bchn 10$c$ (solid lines) shows access points "a" in cells C2, C4, C7, C12, C18, C26, C35 and C47 which designated "a" cells are derived from Eq Ffnc 2. The present MMM invention is not limited to these extremely simple factoring functions in any manner. Factoring functions are only provided as examples to explain mathematical algorithms or equations to identify designated "a" cells and Bchn or DLT or linked memory cell data structures. Initial state functions include, at a minimum, the mathematical equation and the initial state parameters with define the boundaries of the set of cell location numbers in the DL, Bchn or LMC. For example, Ffnc may be a differential equation with initial state parameters, or may be boundary value equations, linear equations with 2 or more variables, polynomial, quadratic (inclusive of quartic, quintic), trigonomic, radical, exponential and rational equations, among others. Additionally, quantum equations (such as quantum linear algebraic equations) can be used for these initial state equations and functions.

Bchn cells not carrying critical "a" data hold either no (NULL) data therein or nonsensical data therein. The term "nonsensical data" refers to and is defined as data conceived or made without regard for reason or reality and includes absurd, bizarre, crazy, fanciful, fantastic, fantastical, foolish, insane, preposterous, and unreal data. "Nonsensical data" is not related nor relevant to any critical data. This nonsensical data can be generated by the knowledge expander KE engine discussed below without the initial input of OSD into the KE engine. NULL data can be generated in a like manner. Alternatively, the nonsensical data may be generated using antonyms of extracted OSD critical data (this critical data being OSDseg data). The KE engine may include an AI machine supplied with the common or remainder words taken from the OSD. Stated otherwise, the OSD module 60, using the CCT modules, first identifies the critical words and phrases, then extracts those words and phrases from the OSD based upon content analysis and contextual analysis looking for critical data. The non-extracted words and phrases are remainder words and possible common words such as and, the, a, on, off, street, road, etc. The Bchn and the DL (as noted above, the DL can be configured with immutable cells and cell connectivity in a manner generally similar to the Bchn) may include cells storing critical "a" data, nonsensical data, or other remainder data or common word data. As background, remainder data is discussed in the '301 patent in connection with identifying, extracting and storing remainder data different than critical security, select, or important data.

Additionally, the present invention utilizes a time-based mathematical function to either build a blockchain "fork" in dashed lines from the linear Bchn 10$c$ in solid lines. The forked Bchn is called a blockchain branch or Bchn branch herein. Conceptually, the blockchain can be thought of as a single row of cells in a two-dimensional spreadsheet of cells (a 2D Bchn). In the data construct of FIG. 1, Bchn branch extends from a forked cell C4 in the blockchain 10$c$ (shown solid lines). Bchn 10$c$ is the stem, and the forked branch 13 is shown in dashed lines. In some sense, a three-dimensional 3D blockchain data structure can be constructed and replicate the shape of a tree wherein branches linearly or otherwise extend from particular fork cells from the supporting branch or blockchain stem. Tree-like data structures are discussed later.

Currently in connection with forks in blockchain, some technicians describe these technical aspects as a soft fork wherein the software updates to the Bchn do not affect the core Bchn rules of the project, so both versions are still compatible with each other and use the same blockchain. With a soft fork, the new chain is backwards compatible with the old chain. The blockchain continues as it had, but with slightly different operating protocol.

The forked cell C4 in the Bchn data structure can be defined or designated by another mathematical initial state equation. This to-be-forked cell equation is identified herein as FfncFk. A simple example of the 3D Bchn would use Eq Ffnc 1 as the Bchn stem function and Eq Ffnc 2 having a maximum initial state set at "4" wherein cell C4 would cause a fork to form Bchn-Fork 13.

FIG. 1 shows the Bchn-Fork 13 in dashed lines. Branch cells C1$br$, C2$br$, C3$br$, C4$br$, C5$br$, C6$br$, and C7$br$ are shown. The Bchn 10$c$ (solid lines) employs Eq Ffnc 1 to designate critical cells in its chain. It should be noted that Bchn 10$c$ (solid lines) may continue to have either access points "a" or segments of the OSD (inclusive of supplemental data and edited data derived form OSD) or access pointers such as urls pointing to another domain in the common internet where the OSDseg (the critical "segment" data extracted from the OSD, subject to the security protocol of the present invention). "Access points" in a Bchn system may give the user "access" to another critical data-bearing cell in the Bchn. In this data construct, the OSDseg is stored on-chain, but in a different cell than the "a" access point cell. As a crude example, an on-chain NFT artwork data construct permits an NFT token owner, having an ownership claim over token "a", to have electronic access to the artwork stored in another NFT cell. Hence, in this NFT data construct, the token owner is permitted access to his or her "a" cell which re-directs the user, upon access to the "a" cell, to the artwork-bearing on-chain cell on the NFT. Others, who do not have ownership rights to access "a" cells, cannot access the on-chain artwork. Most NFTs have artwork stored off-chain. The off-chain storage includes centralized NFT servers within the NFT platform company or an InterPlanetary File System (IPFS) centralized server.

In order to reconstruct data stored in designated cells in blockchain 10b and 10c (solid lines), the owner or rightful possessor of the data would utilize the initial state function which establishes the cell location of critical data-holding "a" cells. The initial state function Ffnc can be reverse generated to locate designated "a" cells. In this manner, the initial state function Ffnc is a high value data security element. The function itself could be stored in the DSD or data store diaspora. All the Ffnc functions are high security data and care should be taken to secure the same.

Rather than have a maximum cell count value for the Bchn, the initial state function Ffnc may operate with a time-based function rather than a maximum cell Q-cell count value limit. For example, the time-based function may be based upon the amount or the frequency of OSD input data, input by the user or a function of the input OSD data, that is OSD bandwidth, processed by the MMM system and process. A higher data flow or data bandwidth could be monitored by the time-based function. For high input data events, the timing functions may increase by shorter frequencies.

Also, it should be noted that these Bchns may be capped at a maximum cell count/time-based limit or can continue to grow. The continuous growth is similar to cryptocurrency token ownership growth. However, Bchns with continuous growth patterns, without a maximum initial cell count, may place a burden on the blockchain platform 12 in FIG. 3. Some Bchn operations may not employ POW/POS functions. It should be noted that the linked memory cell data construct does not necessarily use the POS/POW function. It may be possible to build Bchn and DL data security and data stores for data having high IIV and EIV using growth systems other than the POS/POW function. As proof of work POW Bchn cell growth increases, the energy to build each following cell increases. POS functions are more efficient.

The Bchns 2D and 3D blockchain system and process may be dynamically built out with blockchain stems and Bchn branches either organically, dependent upon the amount of secure or select data processed by the MMM system, or based upon the time-based build out function Ffnc-Blg. Organic growth preferably may be limited by either a time-based growth function limit or a cell count Q-cell limit. Other limits include (a) Q-cell limits imposed after a predetermined time (t-NoGrow); (b) a limit on attack detected events (Q-attack limit) resulting in a no growth command, and then followed by a reset command; (c) limits on OSDseg stored in the Bchn or DL (Q-data limit); (d) nonsensical data limit (Q-non-data limit); (e) bandwidth factors (velocity of growth, velocity of OSDseg data growth; velocity of nonsense data growth, etc.); (f) reconstruction event (Q-recon limits, and velocity); and (g) combination of these growth limits. In either case, the FfncBlg is the applied function.

Another methodology to enhance random development of a 3D Bchn is to model the 3D Bchn based upon stick photographs or images of living trees. The image of the living tree used to construct and forming the imagery basis of the stick-formed Bchn is a high value data security item. The substrate tree image used to form the Bchn identifies the length of each stem (see stem 20, FIG. 2), and the cellular location of forking cells in the stem and in any secondary branches in the 3D model of the Bchn. Further, the cells containing critical data, the "a" cells in FIG. 1, can be viewed as being the leaves on the living tree which have been changed due to the autumn change-of-seasons color change. Each color-changed leaf representing a unique CNT bearing data cell in the blockchain. The reference to "trees" herein is broader than common trees. As used herein, a "tree" data construct is defined as includes all types of tree-like structures including but not limited to include trees and leaves (such as the veins in a tree leaf), and various other organic and non-organic tree-like structures, such as a bronchial tree (for example, in a human lung or a chicken lung), cracks in ice, lightning, nerve systems, purkinje fibers, neurons, rentinal arteriolar-venular connections, certain rivers (see, for example, rivers in Mexico's Baja desert), seaweed, slime mold (for example, didymium clavus, phylum myxomycota in the kingdom Protista, and others), a leaf skeleton (for example, *hydrangea*), and other organic and non-organic systems that look like trees. In FIG. 3, a "forest" of Bchns is shown formed by a multitude of blockchains. The term "forest," used in connection with the multitude of blockchains in excess of 25 blockchains. It is believed that a platform having less than 25 blockchains is insufficient to hide and obscure OSD data given the sophistication of bad actors.

A buildout Bchn with stems, forks and branches (see FIG. 2) may include reset functions Ffnc-RE (or Fnc-Reset) in order to enhance the data security of the Bchn system. If the buildout of these blockchain systems, with blockchain "stem" elements, blockchain "forking" cells, and blockchain "branches", contain maximum cell values/time-based limits, an additional reset function Ffnc-RE may permit reuse and reconfiguration of critical data or access point information stored in designated cells. The data may be rewritten and stored in a secondary branch of the Bchn. The "reset" as used herein refers and is defined as to a three-step process. First, the critical data is copied to and stored into either a different branch on the original Bchn or to a newly formed or forming Bchn cell in the ecosystem (a copy, then store operation). Optionally, critical data can be written into an existing, then designated "a" cell (designated by the Ffnc-RE). Second, the old "a" cell or earlier branch carrying the "a" cell is deleted. NFTs, a subset of Bchn, can be configured to burn or destroy the access "a" point contained in the critical or designated Bchn cell.

Further, to obscure critical "a" data segments in the Bchn, the Bchn may have (a) Bchn branches with no critical data segments or access points, and/or (b) non-critical cells with nonsensical data, false data, NULL data, or common word data in these Bchn, Preferably, all non-critical cells with nonsensical data, false data, NULL data, or common word data. The same is true for DL and LMC data constructs. This seeding of data in non-critical cells also obscures the critical data from unauthorized users. A "noncritical" blockchain branch only has non-critical cells and may be considered to be sacrificial branches. To avoid conflict between critical data Ffncs and non-critical data Fncs, the non-critical data Ffncs. Upon triggering certain time-based functions or preset Q-cell counts or other events (see the attack detection process below), the reset function Ffnc-RE may (i) overwrite or insert sacrificial branch data with critical data; (ii) delete the earlier, old Bchn branch; or (iii) copy the critical OSDseg data to another Bchn or another cell in the Bchn stem or branch supporting the sacrificial branch.

Another enhancement to the entire data security formless system would have a series of functions Ffncs which change over defined time frames. As an example, the initial state values function Ffnc can be altered for Bchn, DL or LMC, for each forking event and for each reset event. Each changeable Ffnc and the initial state conditions should be securely stored and maintained to permit reconstruction of the OSDseg, etc. as needed. Contrariwise, if the system or process uses changeable Ffncs to locate non-critical data cells, then the non-critical Ffncs must be inferior to the critical data Ffncs as described below.

In connection with non-critical cells with nonsensical data, false data, NULL data, or common word data, care must be taken to conform the critical data Ffnc cell locations with the non-critical data Ffncs. To accomplish this, the non-critical Ffncs must be "inferior" to the critical data Ffncs. The term "inferior" is defined herein in the sense that each non-critical Ffnc must be screened so that the critical Ffnc cell locations are not overwritten by the non-critical Ffnc cell locations. One algorithm would be (i) compute all critical Ffnc cell locations, (ii) compute all non-critical Ffnc cell locations and (iii) then mask out or delete all non-critical Ffnc cell locations which coincide or match the critical Ffnc cell locations. Hence, the critical Ffnc cell locations are superior to the non-critical Ffnc cell locations, or, stated otherwise, the non-critical Ffnc cell locations are inferior to the critical Ffnc cell locations. Other mathematic algorithms may be applied to assure that the non-critical Ffncs are inferior to the critical Ffncs.

In order to locate the shifting location of critical data/access points, the user or sys-admin would need to keep track of the initial state time data and the initial state values of each function as well as the order of operation of each function. The serial play order or sequence order of each function Ffnc, the initial state values for each Ffnc (including initial time and Q values) are high value critical data security elements of the entire system.

In addition to the concepts set forth above, each blockchain may include in the non-designated cells, a random presentation of data (false flag "FF" data) or random presentation of access points which further obscures the important data cells/access points. For example, the MMM system and process may gather access point urls from active websites and seed the non-designated cells with that random presentation of url access points. In that manner, the Bchn system obscures true OSDseg data with miscellaneous unconnected and unrelated data. The utilization and insertion of random data into Bchn cells has no value to the person or owner or sys-admin. In another process, the KE knowledge expander module 62, FIG. 3, may be programmed to generate antonyms representing data which is contrary to the critical sensitive security data. This contrary or contradictory data will further confuse the bad actor who obtains the data. The KE system can be employed to generate nonsensical data, false data, or common word data. Common word data can be extracted from the OSD or can be gathered by the KE engine off-chain or off-platform.

Figure 2:
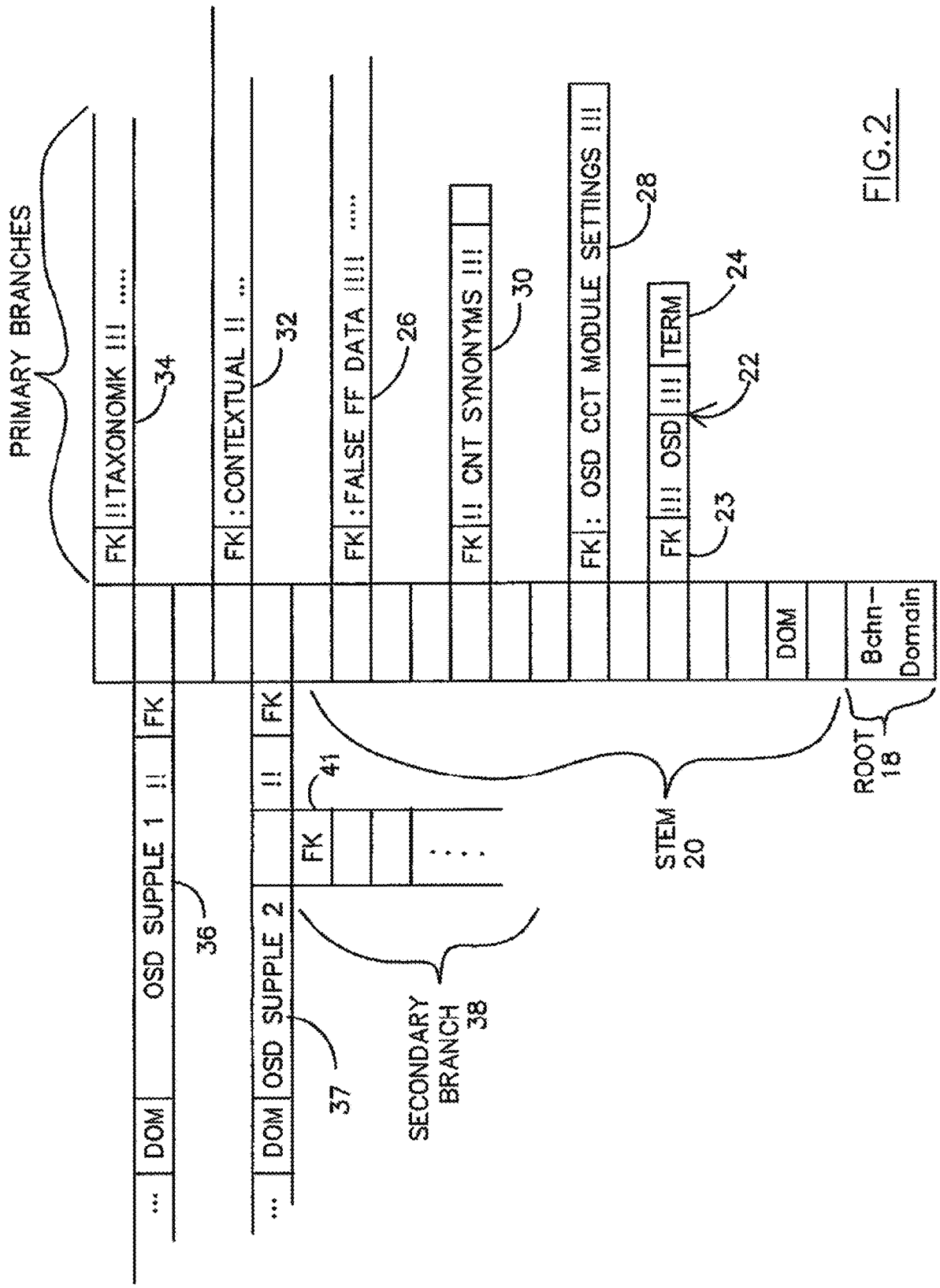
FIG. 2 diagrammatically illustrates a forked blockchain.
Figure 3:
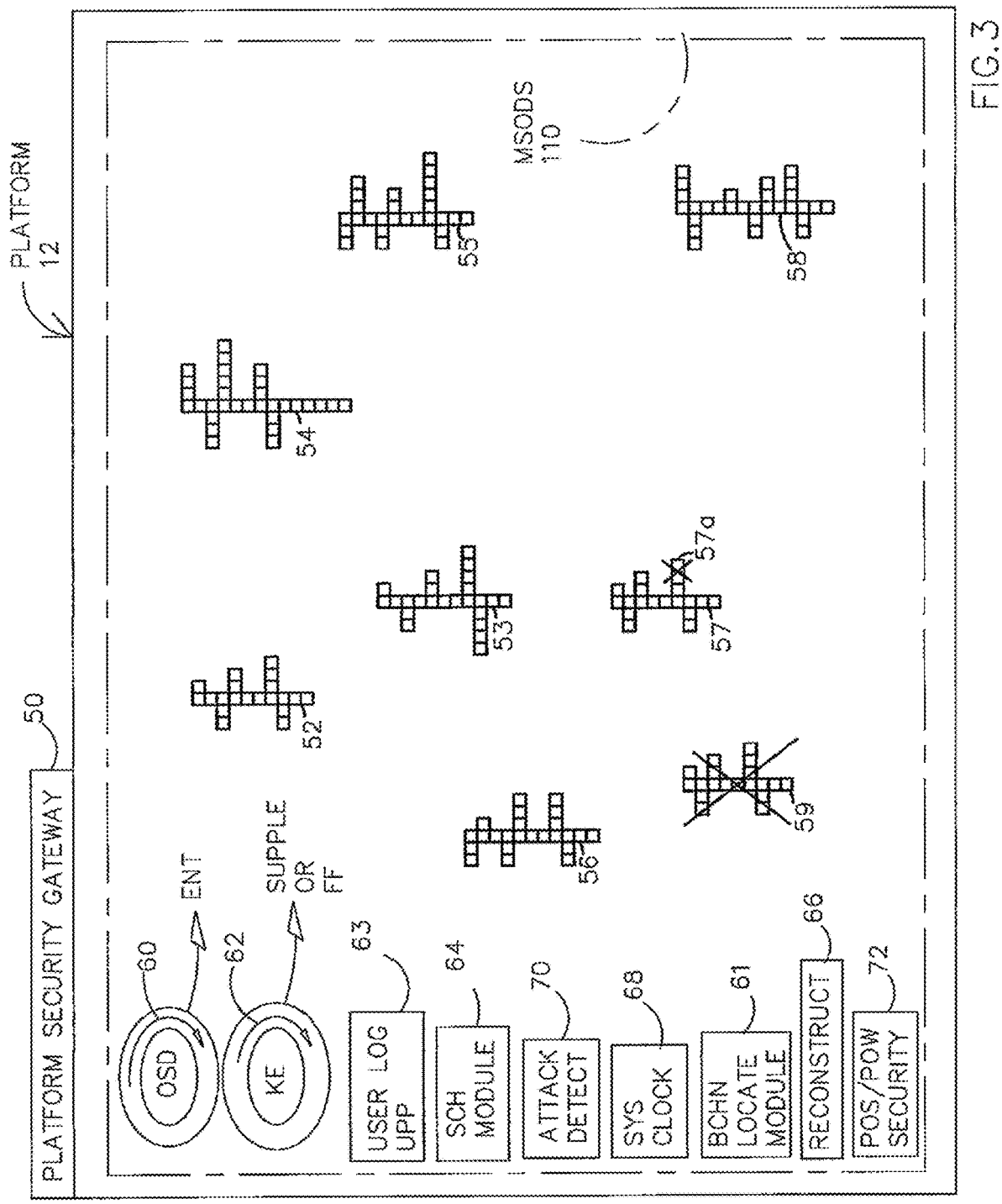
FIG. 3 diagrammatically illustrates a blockchain platform with a security gateway and several software program modules or functions interacting with the numerous Bchns supported by the platform.

FIG. 2 diagrammatically shows a blockchain having various branches. As noted earlier, there are various configurations which may be imposed upon the construction of the blockchain, DL or LMC. FIG. 2 diagrammatically illustrates one of the several implementations of a blockchain. A DL and LMC is similarly configured. The blockchain platform 12 should be able to identify each blockchain on the platform. In the MMM system and process, reference is made to Bchn root 18 as indicating the electronic location of the blockchain or the distributed ledger technology DLT data element which is linked to the other DLT cells (also for the LMC systems). In some blockchain systems, the blockchain inherits the characteristic of the blockchain platform. As one example of cellular linking, each cell in the blockchain contains a digital hash value of the previous block without regard to whether the previous block as critical or designated data significance. The hash value is computed based upon an algorithm with a semi-random nonce value. The algorithm may be unique to the blockchain itself or the blockchain platform may dictate the hash algorithm. The concept of forking a blockchain stands on the principal that multiple blockchains can point to the same hash in the previous cell. One feature of some blockchains is the use of a timestamp and a nonce as part of the hash value. Therefore, each cell has both data components related to inclusive data, time and digital location on the blockchain platform or blockchain ecosystem. Other cellular linking systems, other than the hash value protocol, may be utilized. Again, referring to NFTs technology, in order for an NFT token be generated or minted, each transaction results in a new data block that must be hashed. The NFT block includes the value of the hashed header of the previous block. Before the new NFT transaction or token is added, the header of the previous NFT block is validated using that hash value. In the blockchain, DL and LMC platforms forming the MMM system and process, software processing operations may be delegated to the cells rather than inherited from platform 12. The immutable NFT inherits the network and security of the blockchain platform, and allows customers to mint or create NFT tokens and then trade NFT tokens while maintaining the provenance of the NFT token.

Figure 4:
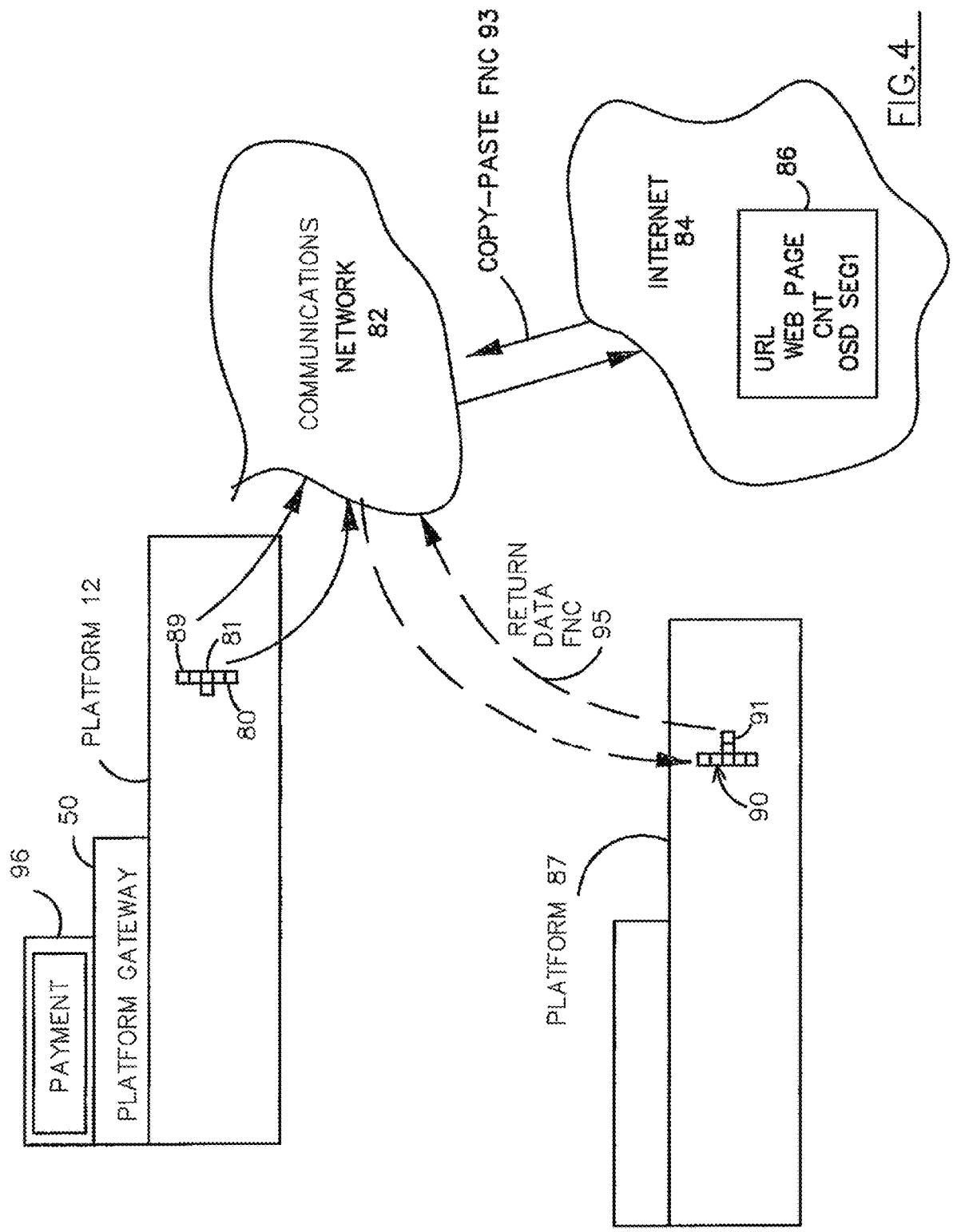
FIG. 4 diagrammatically illustrates a blockchain platform communicatively coupled to a communications network, this comm network further communicatively coupled to and leading to the internet wherein the internet supports access to one or more webpages and, by definition, the webservers serving up webpage content under the control and command of the party accessing the webpage. This control and command originating from a blockchain on the blockchain platform.

NFTs are a technologic subset of blockchains. Similarly, Bchns are a technologic subset of DLs using distributed ledge technology or DLT. LMCs are a further expansion of DLs. All discussions of Bchn herein apply equally to DLs and LMCs when the DL or LMC has a cellular immutability characteristic and a cellular connectivity, either a cell-to-cell connectivity. Cell-to-cell connectivity also applies to cross-platform operations. If one cell is on a first Bchn/DL/LMC platform and a second cell is on a second Bchn/DL/LMC platform, there is cross-platform cell-to-cell connectivity. Connectivity equations (the algorithmic links) provide distinct functions in these Bchn and DLs and LMCs. The term "cellular connectivity" refers to and is defined as an on-platform cell-to-cell connectivity and an off-platform cell-to-cell connectivity. Off-platforms may reach into different computer-based memory systems. Bchns and DLs and linked memory cells LMCs all have cellular connectivity. FIG. 4 shows an off-platform system.

Returning to FIG. 2, the subject blockchain must be identified somewhere in the platform ecosystem. Root cell 18 provides for a platform domain location. Stem 20 extends from cell 51. Cell S2 does not contain any critical information and is provided solely for confusing and hiding critical data. In one construction of the MMM blockchain, the user may wish to save the Microsoft DOM or document object model in cell S3. The DOM is discussed in the '301 patent which is incorporated herein by reference thereto. It is known that the DOM in its basic form shows the overall structure of the document such as paragraph markings, indents, tables, list location and other objects in the particular document. Documents other than Microsoft generated documents have similar document object models. Although stem 20 in FIG. 2 is shown as having primarily blank or non-designated cells, stem 20 could be configured otherwise based upon the initial state functions employed to build out the blockchain. See the discussion above relative to non-sensical cells and other non-access "a" cells.

Although a single Bchn platform is the primary embodiment discussed herein, multiple Bchn and/or multiple DL platforms can be utilized. See FIG. 4. A cell on one Bchn/DL platform "A" 12 can be cross-platform linked to another cell on Bchn/DL platform "B" 87. This cross-platform link (12 to 87) is an external reference (link) to a cell range in another workbook, cell or platform. The cross-platform link may employ an external reference formula or algorithm. Cells that contain data, or that previously contained data, can be linked to a destination sheet, workbook, ledger, Bchn platform or DL platform or linked memory cell platform. Sometimes, these links are called a dimensional reference. All discussions of Bchn below apply equally to DLs and linked memory cells when the DL or linked cells have a cellular immutability characteristic and a cellular connectivity characteristic. The term "linked memory cells" is defined as and encompasses more data constructs than Bchns and DLs.

The blockchain in FIG. 2 has eight primary branches extending from the stem 20. Branch 22 is created by fork FK 23. Branch 22 includes critical segments of OSD, that is, OSDseg1, OSDseg2, etc. Branch 22 also has a terminal "term" block 24. Terminal block 24 could be generated based upon a cell count Q-cell limit or a time-based limit. Other branches of the blockchain, for example, false flag FF branch 26 continues to grow as shown by the extending dots and the branch continues to extend and grow based upon and initial state function locked into the subject blockchain.

The following Table shows several examples of the types of initial state functions Ffncs that the sys-admin or operator of the MMM system can employ. These Ffncs apply equally to DLs and LMCs. As stated above, there are many types of initial state functions, in addition to the simple factoring initial state functions discussed above.

| Table Listing Bchn Function Types |
| --- |
| Ffnc to Designate critical Bchn cells holding critical data |
| Ffnc for storing nonsensical, etc. data |
| Ffnc for storing Supple, Edits, etc. data |
| Ffnc for growth of particular Bchn (stem and branch) |
| Ffnc for forking to produce branch |
| Ffnc for linking one cell to another cell (cellular connectivity fnc) |
| Ffnc for resetting stem/branch critical data |
| Ffnc for deleting/extinguishing branch |
| Ffnc for deleting/extinguishing entire Bchn/LMC/DL |

One of the several objectives of the MMM system and process is to obscure the location of critical data, that is, OSDseg data, and to establish a data store system as a diaspora (DSD) to enhance security. However, another of the several objectives of the MMM system and process is to enable a user to reconstruct original source data (OSD). The initial state functions Ffncs for designating critical Bchn/DL/LMC cells holding designated "a" data can, in general, be employed to enable growth of Bchn stem 20 (FIG. 2), growth of a branch, to enable a forking of events to produce a branch, to enable a resetting operation (first copying critical data into a newly minted cell or otherwise overwriting a cell and then deleting/extinguishing critical data cells), to enable deletion/extinguishment of a branch, and to enable deletion/extinguishment of the entire Bchn. The term "extinguish" is defined to include deletion or destruction of either the critical cell data, the non-critical cell data or the entire cell/branch/stem of the Bchn/DL/LMC.

As explained herein, in the event of a severe hacking or malware event, it may be beneficial to delete the critical security sensitive or EIV/IIV data rather than have that data fall into the hands of the bad actors. Therefore, the resetting—deleting/extinguishing branch operation and deleting/extinguishing the entire blockchain operation is one of the several important features of the present invention.

As discussed above, growth of a particular stem or a particular branch of a blockchain can be based upon the number of cells, Q-cell count, or based upon a timing function so that at the time t-reset, the reset operation copies, stores and then deletes the branch/stem/Bchn. The same cell quantity limitation and time frame limitation can be applied to the Ffnc delete branch/Bchn operations. Regarding the cell count quantity limit, the blockchain could maintain a counter for the number of cells in the particular stem/branch or the total number of cells in the Bchn. Regarding the time-based initial state functions Ffnc, the platform may generate consistent, constant timing signals, such as once every millisecond, and the Bchn could maintain time-based counters to determine programmed time periods from a t-start initial state parameter to a t-end parameter wherein at t-end, the pre-programmed Ffnc is activated to accomplish the desired result. Although consistent and persistent timing signals may be generated throughout the entire Bchn/DL/LMC platform, it is also possible that random timing signals could be broadcast through the platform or MSODS. However, the use of random timing signals may effect the security level of the entire system because a bad actor could look for or sense random timing signals. Common timing signals are more "common" prevalent and hence are less likely to arouse suspicion by a bad actor. If non-periodic timing signals are used ("periodic signals" defined as timing signals having a consistent period of repetition), then the initial state functions Ffncs must include non-periodic time-based algorithms to synchronize with the reconstruction command generated by reconstruction module 66 in FIG. 4.

Returning to FIG. 2, the "term" or terminal end cell 24 could be generated by a time-based signal, a quantity-based signal, or a command from the platform software. The termination cell is at the end of a branch. Primary branches 22, 26, 28, 30, 32, 34, are distinguished from the secondary branch 38, at fork FK 41. Although the various branches 26, 28, 30, 32, 34, 36, and 37 are shown as containing distinct categories or classifications of data, the blockchain should include randomized distribution of data in the stem and branches (a different schema to hide these data categories). The data may be mixed together throughout the various branches as noted above in connection with nonsensical data. Also, portions of this data could be stored in stem 20. Branch 28 is shown to include OSD CCT module settings. The CCT module settings are important because the settings for the content, context, and taxonomic filter/modules can be used to begin deciphering hidden original source data OSD and OSDseg. Branch 30 containing content CNT synonym data is confidential and secret. Branch 26 containing the false flag FF data is a sacrificial branch designed to provide a "honeypot" of data which detracts a bad actor from the task of discovering OSDseg in the blockchain. Branch 32 contains contextual OSD data. Branch 34 contains taxonomic OSD data. Branch 36 contains supplemental data obtained by an AISO search using OSDseg1, OSDseg2, etc., to expand the knowledge base and understanding of OSD. The supplemental data OSDsegSupple1, 2, 3 includes a data element linking the supplemental data Supple1, 2, 3 to the OSDseg.

As explained above, this supplemental data may enhance the informatic value to the owner (IIV) and/or enhance the informatic value to $3^{rd}$ parties (EIV). It may be helpful in connection with branch 36 and branch 37 (the later containing supplemental search result data from a second AISO) to include the document object model DOM in order to reconstruct the OSD and add the supplemental data to the original source document and enhance the content of that OSD. For example, this supplemental data may be added in a footnote or an endnote to the reconstructed OSD. Otherwise the OSDsegSupple can be placed in brackets following the OSDseg in a reconstructed, enhanced version of the OSD. Given an adequately high security or authorization clearance, the Supple and Edit data would follow the OSDseg during the reconstruction process.

FIG. 3: a Bchn platform and Bchn ecosystem. It is known that each cell in the Bchn normally has its own cell-based access control. In order to gain access to the data stored in the cell or gain access to the stored access pointer (for example, a url) in the Bchn cell, the user or sys-admin must use the security gateway before entering the Bchn platform and have authorization to access that particular cell (hence the use of the term "access" in the discussion of obtaining data from the cell). Also, the platform gateway may need to communicate with the Bchn cell's access controls prior to the user or sys-admin gaining access to the data in the cell. In an NFT operation, to access a particular NFT token, the person seeking access must pass through platform gateway 50 and then have a code or password to access his or her own NFT. The blockchain gateway may use various security access controls. Single and other multiple combined passwords or "multi-sig" gateway access controls may be implemented by platform 12. Facial or retinal image or voice recognition may also be used. Two factor authentication (2FA) controls may also be used. Once the user gained access platform 12, in an enhanced version, the MMM system and process may include a ZKA access control system to control the user's access to the stored data in the Bchn cell itself. Other access controls may include AKM (authentication key management). ZKA is considered zero knowledge proof ZKP which works to identify the authenticity of someone's statement (at the gateway) to proof at the Blchn cell's access control without showing any knowledge of the statement mentioned. As a result, no information, either from the sender's or receiver's end, can be compromised in any way. ZKA enables end-to-end encrypted communication. An interactive proof is considered zero knowledge if prover P (at the gateway) can convince verifier V (at the individual cell level) of the correctness of the statement, while the verifier V learns nothing beyond the fact that the statement is true.

Use of hash codes for cellular connectivity may be an issue because each block/cell is digitally linked to another block/cell/token by its hash value derived from a snippet of previous cell data. However, the benefit of using cellular connectivity solves the "mapping" security problem. In other words, the Bchn/DL/LMC provides simple organizational structure that can be modified and salted with inaccurate and/or confusing information in order to obfuscate the informational content and informatic value of the OSDseg, OSDsegSupple, and OSDsegSupple-Edit data. These data elements are linked together in some manner so that at full reconstruction the additive data is presented to the authorize user or party. Partial reconstruction permits lower level secured data (compare TS to T,C, and NC data) to be reconstructed and presented to lower level authorized persons.

FIG. 3 diagrammatically illustrates platform 12 with a forest (defined below) of blockchain data constructs, 52-59. Bchns may be DLs or LMCs. In order to increase randomness in this random collection and distribution of blockchain data constructs 52-59, the "domain" location of each Bchn 52-59 is randomized by the Bchn location module 61. As discussed above, in connection with FIG. 2, the Bchn or the initial DLT cell domain locations may be found in root cell 18. The platform domain location of the Bchn or DLT start cell identifies that particular Bchn data construct from other Bchns on platform 12. The domain location introduces an element of randomness in order to confuse the bad actor. If a MSODS is used, the location of each Bchn/DL/LMC in the massive data store may be randomized. The term "forest," is defined by a multitude of blockchains in excess of 25 because it is believed that a platform having less than 25 blockchains is insufficient to hide and obscure OSD data given the sophistication of bad actors.

To enhance randomness, the stem length, fork location and branch length of the Bchn/DL/LMC may be modeled based upon a living tree or a tree-like structure (the image used as a substrate to determine stem, forks and branch lengths of Bchn/DL data construct). In a similar manner, the Bchn can be modeled based upon document object model of the input data OSD. The '301 and '785 patents discuss the DOM MS document object model as a metaphorical DNA blueprint for an MS Office document whereas the actual Word, Excel, or Outlook message is an expression of the RNA as a functional transcript. Correspondingly, the select content or security sensitive data (herein critical data) is an exon in the document branch, leaf, or node element. The special critical data is an exon whereas the DOM structure data itself is the intron. One of the several inventive features of the present MMM invention is that the Bchn/DL data construct may follow the DOM exon structure with the stem, branch, and forks replicating the intron elements in the DOM data structure. This introduces another layer of randomness because most documents have different DOM structures.

Returning to FIG. 3, programs on platform 12 process OSD as diagrammatically shown as OSD process 60. The '301 patent and '785 patent describe OSD processing and outputs such as critical content CNT, synonyms, contextual data, and taxonomic data. CCT filter/modules operate on OSD. In order to enhance the informatic value of OSD and the related CCT, supplemental data generated by AISO from OSD Gens (external or internal data collections ("internal" referring to on-platform data collections, "external referring to off-platform collections)), a knowledge expander KE process 62 is utilized. Although this knowledge expander is discussed in connection with the '301 patent, incorporated herein by reference thereto, the '301 and the '785 patents do not discuss blockchains nor DLs nor linked memory cells. The '301 and '785 patents discuss data flow, data processing and functional aspects of interconnected modules 60, 62, 66, and 70. Modules and functional processes 61, 63, 64, and 72 are new inventive elements of the MMM system and process. However, the '301 and '785 patents do not discuss, in any manner, Bchns, DLs or LMCs, that is immutable data stores and cellular connectivity.

The platform 12 includes a search module 64 which enables an authorized user to search for critical on-platform or linked off-platform data ("linked" referring to cross-linked platforms shown in FIG. 4). Reconstruction module 66 operates on the platform 12. The system clock 68 is discussed above. Platform 12 also includes an attack detection module 70. This attack detection module is discussed in the '301 patent and '785 patent although those prior art references do not discuss blockchain, distributed ledgers nor linked memory cells. The layered attack detection LAD modules trigger the branch growth, data insertion (FF or critical data), and branch or Bchn tree destructions. These Bchn/DL/LMC aspects are not discussed in the prior art references. These attacks, sometimes referred to as cyber attacks, sometimes result in an AISO search using KE engine 62 (FIG. 3) which adds random nonsensical data to the Bchns, typically as new growth Bchn cells, branches tr stems. These cyber attack events using AISP operation use internal or external data collections using segments of the critical data (OSDseg) to locate false flag FF data or nonsensical data or common words which data CNT is seeded into the Bchns of DLs.

Platform 12 either maintains, supports or provides, interconnected modules 60, 61, 62, 63, 64, 66, 68, 70, and 72 which are coupled together and interact as discussed herein. As discussed below in connection with the massive storage MSODS, these interconnected modules 60, 61, 62, 63, 64, 66, 68, 70, and 72 may be independent virtual machines VMs or be combined into one or more VMs operating on the platform of MSODS. The present invention discusses the data flow, data processing and functional aspects of interconnected modules 60, 61, 62, 63, 64, 66, 68, 70, and 72 on platform 12 as the same relates to Bchns, DLs and linked memory cells.

One of the several important points of the MMM system and process is the uniqueness of Bchn/DL/LMC data constructs 52-58. Because each Bchn employs several different initial state functions Ffnc for its stem, for its branch system and for its forking system, the bad actor, once he or she gains access to platform 12 through gateway 50 or otherwise, is confronted with random data structures. As discussed above, the reset function can be configured to form a branch, insert that critical data into a newly formed or grown branch, and then destroy or extinguish the old branch identified by the reset function. The reset function can be time-based or Q-cell based or be triggered by an attack or alert command from the attack detection module 70. Bchn tree 57 has branch 57a that is marked with an "X" signifying that the branch is scheduled for data pruning or destruction. As for Bchn tree 59, that entire tree or data construct is marked for destruction or extinguishment by the overlaid X marking.

As discussed earlier, the KE expander module 62 can be always ON thereby generating supplemental data or, be subject to periodic or random ON operations based upon OSD input, or some type of monitoring of the OSD dated input bandwidth. With the KE expander module ON either continuously or often, this introduces high growth of either Bchn branches, if the supplemental data is keyed or linked to OSD data, or new Bchn data tree constructs. By creating new blockchain data constructs, this introduces a high degree of randomness on platform 12 and this random and continuous growth of blockchain data constructs further obscures the critical data stored in specially designated blockchains. As indicated above, OSD from a single document may be stored in a variety of different Bchns. In this situation, the map from one Bchn with a first group of OSD segments (OSDseg1, OSDseg2, etc.) to another Bchn can be stored in, for example, the terminal end cell 24 of branch 22 shown in FIG. 2. Of course, the map or link could be stored in any designated cell in the blockchain data construct shown in FIG. 2.

Prior art log-in systems and processes. The prior art systems in the '301 and '785 patents describe logging-in user use data and creating a profile for such use. The '301 disclosure has comprehensive monitoring of user activities as a management information tool and information/data command and control center. The system includes an alert system for command and control monitoring regarding how many transactions are being processed, their content, their context, identity of the user, the user's security classification level and the data asset's security classification level. The profile is used as a guard and as a filter to enable or disable various transactions or communications related to the profile. FIGS. 31a and 31b in the '301 patent also show monitoring and logging data post-reconstruction of the security sensitive or select content data. It is also known by persons of ordinary skill in the art that each block or cell in a blockchain is crypto-keyed to the earlier block by a its unique hash value. Prior art NFT platforms have a log or data collection showing who has access to data, and when the person accessed the url pointing to an off-chain or on-chain artwork.

Returning to the inventive platform 12 in FIG. 3, when a user passes through security gateway 50, the user's activities are logged in a user personal profile UPP and log functional module 63. The log-in function/module 63 effects persistent and continual tracking of the user. Although a bad actor may gain access to platform 12 (or MSODS) via security gateway 50, the user log module 63 monitors his or her activities including activation of the search module 64 to locate data stored in the Bchns on the platform, search strings and results, as well as any access granted to any cell in the Bchn forest. Simultaneously, the attack detection module 70 is activated to monitor this UPP activity, including located content, their context, identity of the user, the user's security classification level and the data asset's security classification level as a guard to enable or disable various transactions and communications related to that profile activity. Assuming that the user is properly authorized, the user is permitted access to Bchns 52-58 (Bchn 59 being processed for deletion/extinguishment).

One security enhancement in the MMM system and process may include the use of a "user access Bchn" or UA Bchn which is initially built based upon the user's UPP and is expanded for each platform access request RQT. Each Bchn access RQT by the user is represented by a newly added UA token or block on the UA blockchain. Also, the UA Bchn grows by an additional Bchn token upon "returned search" generated by the system based upon the earlier search RQT. Another UA token is added to the UA Bchn when the user will soon be presented with returned search result pointing to a critical content CNT cells (pointing to the so-called "a" cells in FIG. 1). A further UA token is generated when a user accesses critical content CNT via one of the designated "a" cells in the blockchain. The attack detection module 70 monitors the UA growth of user access activity on the UA blockchain. In this manner, the UA blockchain can be used as a sensor monitoring the user's platform activity and immutable capture of on-platform activity.

The attack detection function/module 70 monitors the UA block growth. Bad actors or unauthorized users may exceed predetermined levels of UA or "user access" activity. For example, a certain user at a certain security level clearance could be limited to a quantity Q-searches, or be limited to on-platform time frame T-access-limit, or "search error" quantities Q-nill-searches. Other indicators of bad actor actions are known in the prior art. Once these limits are met or exceed, the user is denied access by the attack detection function/module 70. Other than the MMM UA operations described above, the further operations of the attack detection function/module are described in the '301 and '785 patents.

As discussed above, the growth of each Bchn in platform 12 may require consensus by proof of stake (POS) or proof of work (POW). By monitoring the UA Bchn growth by the POS/POW function and module 72, the user can be cut off from reconstructing all or a portion of OSD by the POS/POW module 72. In this example, to add a new UA token or cell, a POW/POS consensus must be reached. Without the required POS/POW consensus, the new token/cell is not minted or "grown" on the UA Bchn and the user's access to the data-containing Bchns on platform 12 is denied. As described in the '301 and 785 patents, the original source document OSD or a portion of the OSD can be reconstructed with the application of a user's security clearance that matches or exceeds the security level of the OSD or the OSD portion. The POS/POW module 72 denies (a) further searches on the platform; (b) viewing or reconstructing or obtaining the OSDseg from the "a" designated Bchn cells; and (c) excludes or exiles the bad actor by closure of the security gateway 50.

Another security enhancement, either combined with the "UA block growth" function or independent of this UA block limitation, involves returning false flag FF content CNT data to the user for a predetermined number of initial searches, a "Q-FF-test." The bad actor is shown search results in search module 64 showing FF data (not ASDseg data). Another security measure is the use of "secret personal events." If the user has been proper security clearance and has basic pre-access knowledge of the initial presentation of, for example, five false flag returns associated with the user's first five searches, and the user does not exceed, in a predetermined time, this false flag FF CNT search result data via module 64 (for example, a 60 sec countdown to "pass-through/over" these five FF search returns), then the MMM security system "knows" that the user knows that the first five returns are false flag data in the user's search results, the "secret personal event." A bad actor, having no knowledge of the secret personal event, would spend more than 60 sec reviewing the five FF data results. This security enhancement is similar to the use of a "secret code word known only to the authorized person and the system." The Q-FF-test of five false-flag return search results and the limited FF review time is the same a knowing the secret code shared only by the platform and the user. AI may be used to adjust the Q-FF-test, both as to the number of FF search results p[resented, and the FF-test time, all based upon the user's past performance on the platform. The AI as part of the attack detect module 70 can adjust the Q-FF-test limits based upon the user's previous visits so the platform. As discussed above, there are many false flag content "FF CNT" incorporated in the forest of blockchains maintained on platform 12.

FIG. 3 also shows that the operating system on platform 12 includes a reconstruction module 66 which enables the authorized user to reconstruct all or a portion of the OSD assuming the user has the proper security credentials. Reconstruction is discussed in the '301 patent. Unlike the prior art '301 system, the inventive MMM system and process has a link connecting the OSDseg in one "a" cell to the OSDsegSupple in another "a" cell and to the OSD-segSuppleEdit in a further "a" cell.

FIG. 3 also diagrammatically shows an MSODS 110 (see dash-dot-dash lines) as an alternate embodiment replacing platform 12. Interconnected modules 60, 61, 62, 63, 64, 66, 68, 70, and 72 are operatively deployed in MOSDS 110. The MSODS is a massively scalable object data store, "MSODS," for unstructured data (for example, see the Azure™ blob data storage system). The term "platform," when used in connection with a MSODS, is not particularly accurate because the MSODS 110 is variable in size because it is designed to handle massive amounts of data, unstructured or otherwise, and hence, the MSDOS is a variable data storage space. Interconnected modules 60, 61, 62, 63, 64, 66, 68, 70, and 72 in MOSDS 110 may be independent virtual machines VMs or may be combined into one or more VMs operating in the MSODS. Bchn/DL/LMC data growth and size when deployed in the MSODS is generally not an issue given that the MSODS can expand (and contract) based upon the OSD input, output and flow velocity. A private, secure massive object data store for the MMM system and process may adopt a different computer-based storage identification system rather than the more common root/dir/subdir/subsubdir etc. data storage system. Since these massive object data stores handle unstructured data, the Bchns/DLs/LMCs discussed herein may operate well on a private, secured massive object data store which are massively scalable cloud storage facilities.

In connection with linked memory cells (LMCs), the MSODS is an expandable collection of memory cells (a plurality of memory cells). The MMM system and process data construct takes a subset or a sub-plurality of these memory cells and assigns to that cellular LMC subset both a cellular immutability characteristic and a cellular connectivity characteristic. The resulting LMC (linked together roughly as described above in connection with Bchn) functions in a similar manner to the Bchns discussed above except that the LMC may not inherit all the characteristics of the Bchn platform. LMCs possess potential for stem/branch growth, extinguishment (destruction of branch, single cell, entire LMC), monitoring for unauthorized use or access, and cellular data storage. Some of the functions shown in FIG. 3 may be programmed internally into the cells of the LMC. For example, the LMC may have a UA log branch which internally accesses efforts to discover critical data stored in the UA-loaded LMC. The UA log being a branch in the LMC. A particular LMC may have its own time clock, Ffnc-TimeClk, which (a) accounts for the periodic and persistent time clock operating on the entire MSODS, but (b) alters that persistent "universal MSODS" time based upon its pre-programmed initial state Ffnc-TimeClk for its own time-based growth/fork/reset/destruction functions. In connection with reconstruction data efforts, the locate module 61 and reconstruction module 66 would first synchronize the LMC-specific Ffnc-TimeClk to the universal MSODS time, then locate the "a" critical data cells in that particular LMC. Since LMC stem/fork/branch growth is internally controlled by the LMC-tree specific Ffnc-TimeClk, random internal-LMC data storage is achieved. In other words, LMCs may permit the builder of the MMM system and process to internally program certain LMCs to act in an independent manner compared to LMCs in the MSODS (stated otherwise, Bchns may be limited by the platform clock). Also, DLs may be better suited to operate on MSODS than on Bchn platforms.

Additionally, these LMC data constructs from LMC block-like structures referred to herein as LMC-Blks. A LMC-Blk can function in a similar manner to the Bchns discussed above. A plurality of LCM-Blks 52-59 maintained on MSODS 110 present a random forest of LMCs to an unauthorized person or entity similar to that shown in FIG.

3. Also, these LMCs may be disconnected from the POS/POW constraints imposed on Bchns operating on Bchn platforms.

FIG. 4 diagrammatically illustrates the MMM system and process with a Bchn 80 on platform 12 with cells 81 and 89. Cell 81 has an access "a" pointer stored therein which is accessed by an authorized user. This access "a" pointer stored in the blockchain cell 81 could be a url pointing to webpage 86 on Internet 84. In other words, the critical CNT in cell 81 is an "access pointer" url permitting to user to access critical data at the url (the url being encoded in the Bchn cell). See the solid lines in FIG. 4. Once the user is presented with the url access pointer, he or she engages Internet 84, via communications network 82, to view the url and the related content CNT at that url. In this sense, the critical data is stored off-chain and is viewable once the user has the url or "access pointer." In some situations, the user of platform 12, while activating the url access pointer, leads to an off-chain data source containing an OSDseg. This off-chain data store on webpage 86 may be a useful way to establish the data store diaspora DSD. The size and scope of content on Internet 84 in webpages may enable the MMM system and process to hide critical data segments OSDseg1, OSDseg2, OSDseg3, etc. in plain sight on the Internet and yet the segmented data is so highly dispersed on the Internet that bad actors could never identify the DOM for the webpage-stored critical data segments nor the OSDseg1, OSDseg2, OSDseg3, etc. However, in a highly used or accessed secured platform 12, the perpetual outflow of data requests may indicate to a bad actor the source and electronic location of blockchain platform 12. In other words, the bad actor monitors the ingress and egress of data from the platform 12 and surmises that this flow of communication is significant and have high IIV or EIV value. Once an authorized user has accessed the url and webpage 86 with OSDseg1, the reconstruction process would include a copy and paste function 93 to retrieve the OSDseg1 and place it in the correct, reconstructed document or data stream for the authorized user.

FIG. 4 also shows the Bchn cell 89 on platform 12 accessed by the authorized user. The cell 89 access "a" point transits comm network 82 (see dashed lines) and permits access to cross-linked platform 87 and, more particularly to Bchn or DL 90, and specifically cell 91 on Bchn or DL 90. The dashed lines leading from cell 89 to Bchn cell 91 indicate the access. For a reconstruction operation, the cell 91 data is transmitted as part of a return data function 95 to the user accessing platform 12.

Although a single Bchn platform has been discussed herein, multiple Bchn and/or multiple DL platforms can be utilized. This cross-platform link is an external reference (link) to a cell range in another workbook, cell or platform. The cross-platform link may employ an external reference formula or algorithm. Cells that contain data, or that previously contained data, can be linked to a destination sheet, workbook, ledger, Bchn platform or DL platform. Sometimes, these links are called a dimensional reference.

Another feature shown in FIG. 4 is the payment portal 96. An authorized user can effect payment via payment portal and function 96 (for example, a debit or credit card payment, transmitted from portal 96 to a credit card processor), thereby paying the owner/operator of platformism 12 for the user's access rights. The platform receives, from the user's credit card processor an indication of payment. The user may wish to obtain (a) the OSD, (b) a portion of the OSD, or (c) enhanced data from platform 12 such as OSDsupple, OSDsuppleEdit, OSDsegSupple, etc.

Rather than a single Bchn platform as shown in FIG. 3, multiple platforms may be utilized. Typically, the use of multiple platforms would require multiple security gateway access functions or modules requiring an authorized user to input his or her platform passwords multiple times. The current implementation of Bchn platform requires an initial security password or security key to access platform 12 and possibly a second security password or key to access an individual cell in the blockchain on the platform. In this manner, one authorized user with a low security key could access some content CNT on a single blockchain but be denied access to higher security level content CNT on that same blockchain. In other words, the lower-level security key would not "open" the content requiring the higher security level in that particular blockchain. In contrast, the person with the higher security key could access all secured data within the scope of his or her higher security level on that particular blockchain.

In order to avoid a particular blockchain platform from being "locked down" or encrypted by a bad actor, thereby prohibiting access to critical data content CNT stored on the platform, the system operator may establish two platforms using different initial state functions Ffnc to grow the blockchain trees or data constructs on each particular platform. The initial state parameters affecting the operation of the initial state functions Ffncs must be properly stored. If one platform is compromised by unauthorized, platform-wide encryption by a bad actor, the system operator, having knowledge of the two initial state functions Ffncs and the initial parameters applied to those functions, can maintain and reconstruct the original source data OSD as segmented in the second, non-effected platform.

Regarding reconstruction operations, the blockchain platform may interact with a high-security designated computer in the following manner. If an authorized user requests full reconstruction the original source document OSD, the reconstruction functions/module 66 (see FIG. 3) would locate the document object model DOM data or similar OSD object data from one blockchain on platform 12, and then obtain the critical data CNT from individual cells from one or more of the blockchains maintained on platform 12. The UPP log of user activity (see function/module 63) monitors these acts in the UA of the authorized user both with timestamps and access log cells (the blockchains having the DOM and CNT data). As discussed above, the addition of access log cells sometimes requires activity of the POS/POW module 72 and if the so-called authorized user exceeds activity parameters established in the attack detection module 70, the user's authorization ceases and his or her ability to establish a fully reconstructed original source document OSD is terminated. Although this discussion focuses on the entire OSD, the same process can be implemented in connection with a partial reconstruction (based upon a user's low security clearance level) with low level security designated CNT. The use of a high-security designated gates and access processes recognize that only "special" computers should be permitted to reconstruct entire OSD.

Although the MMM system and process has been explained in connection with the use of blockchains on platform 12, it is believed that independent cells in the distributed ledger, DL platform or the MSODS LMCs could operate to form "islands" of cells to hold critical content CNT, including but not limited to critical data segments OSDseg1, OSDseg2, OSDseg3, OSDsegSupple, OSDsegSuppleEdit, etc. This critical content includes the DOM of the OSD, the CCT module settings (discussed in connection with FIG. 2 above), content synonyms, and contextual data. Sometimes, taxonomic data is also critical data in relation to the entire OSD since this taxonomic data can point to relevant security sensitive or select content in the original source document. In a similar manner, the supplemental data OSDsupple1, 2 may be critical data dependent upon how refined the search is (revealing key aspects of the OSD) or how expansive the search results are from the knowledge expander module 62.

Applications and Variations: As indicated earlier, the MMM system and process can secure personal data profile PDPs and corporate data privacy CDP and CDP protocol and the underlying data. As an example, regarding HIPPA data, that data can be relatively easily identified by content and context filter/modules and stored on a personal Bchn platform. The person would have the primary control over all Bchns on the platform and individual Bchns would be created for each physician or diagnostic events (these diagnostic events requiring multiple physicians and health care providers to have access to the Bchns associated with the designated diagnostic event). In connection with a physician-related Bchn, the Bchn data tree or data construct could be accessed by both the person's security code or password and a unique physician security code. In connection with diagnostic events, access is provided to this group of Bchn data constructs via the person's security code and health care provider security codes. In this manner, HIPPA data is siloed based upon physician-related data in contrast to diagnostic-related data. The same operations can be performed by the DLs and the LMCs.

Corporate trade secrets, CDP and CDP protocol can be stored on a proprietary Bchn platform created for the corporation. By using the MMM system and process on a corporate-facing platform, bad actors would find it difficult to reconstruct trade secret or CDP data. The Bchns on this corporate platform can be grouped in any organizational manner either by project name, taxonomic or hierarchical organizational plan, or by corporate department or segment. The MMM system and process can be configured to comply and apply national and local regulations, guidelines, and ethical standards. Once these national and local regulations and standards are stored in the Bchn cells, the data is considered to be immutable in that it cannot be changed unless the Bchn cell is "destroyed" or in terms used in connection with NFTs, the cell is "burned" and the "a" data stored in the cell (either the critical CNT data or the url access pointer) is no longer operable to identify the critical data object.

The MMM system and process can also handle corporate sub-groups. Contradictory outcomes created by the software and computer programs stored in the Bchn cells from different Bchns can be resolved by activating a Bchn specifically designated to handle such disputes by notifying the personnel in the corporation to respond to communications generated by the dispute-related Bchn. In other words, if a dispute arose between the research and development budget Bchn and the financial-related Bchn (this Bchn automatically generating quarterly or yearly budgets for corporate departments), the hierarchical-related dispute resolution Bchn would summarize the issues and present pro and con positions for the corporation and engage in communications between representatives of the financial division and the research and development division seeking human input for the final corporate position. It is known that NFTs, which are a subset of blockchain technology, may include so-called smart contracts which are self-executing by the blockchain. The hierarchical-related dispute resolution Bchn would have oracles gathering data from the financial related Bchn in the research and development-related Bchn, potentially gathering other supplemental data not found in the outputs from the two Bchns subject to this financial dispute and present the original reports from the two conflicting Bchns and the supplemental information which may assist the final human decision makers in reaching a resolution of the conflict.

Risk Detection and Responses: Regarding risk detection and avoidance, the MMM system and process can be set to provide higher attack detection security accounting for "time of attack" parameters (shifting working hours in time zones), days of the week parameters (M-F), and set to account for external factors such as electrical power supply interruptions (whether system wide or directed to the corporation), weather events (current and seasonal), and environmental external factors. For example, regarding risk analysis, if a corporation determines that bad actors primarily originating from China, the attack or threat detection system in the '301 and '785 patents can be tuned or adjusted to be applied to working time zones in China. External considerations such as electrical power supply issues can also be pre-programed into the threat/attack detection system.

Once the threat/attack detection module is activated by its alert monitoring system, the MMM process could trigger a growth of existing individual Bchns and/or a growth of false flag FF Bchns having nonrelated or nonsensical data. Individual Bchns would have temporary sacrificial stems and branches (branches being delineated by the separation or fork from the stem) during these heightened attacks/alert periods. These sacrificial stems, branches and entire Bchn trees or data constructs, could be programed to be destroyed based upon a time factor placed in the initial state Ffnc which creates stem, branch or newly grown Bchn data construct. In addition to sacrificial Bchn branches, stems and new Bchns, critical data earlier stored in the Bchn system may be duplicated with a new randomizing function Ffnc as described above for the duration of the adverse event. Upon expiration of the time-function, the branch, stem or newly grown Bchn would be deleted, destroyed or burned. In the event the adverse attack period extends beyond initial state Ffnc time period, attack detection function/module 70 could initiate a round of new Bchn growth. Similar operations can be processed by DLs and LMCs.

Further regarding risk, corporate and governmental organizations can communicatively couple existing virus detection modules and hardware and interactive malware modules for communications channels and website portals or sales/service platforms with the threat detection systems 70 as described in the '301 and '785 patents. The MMM system and process can expand Bchn data security systems in response to such detected threats. Processing times on communicating channels may also indicate a malware attack, resulting in new Bchn data constructs to avoid unauthorized release of in-transit critical data.

Dos-Sec-Sys Objectives—Manual Controls of Owner/Operator. With the MMM system and process, the sys-admin can impose overarching or primary controls as objective data security standards, with clarity of rules, flexibility of imposing higher or lesser degrees of security dependent upon the needs of the system, encourage risk acceptance when needed to achieve stated goals and objectives, and impose strict adherence to rules when otherwise required. These MMM processes enable data survivability in the event of a malware or hacking event, generally characterized as data hacking warfare. The sys-admin can select the degree of survival/security protocol; imposing am automatic step-wise response with increasing levels of survival/security protocol (hierarchically triggered increased security levels); and enable AI/machine learning ("ML") to apply survival and security protocols presented by the MMM system and process. The AI/ML engine may be embodied in the attack detection module/function excepting inputs from security gateway 50 system clock 68, Bchn locate module 61, reconstruction module 66 and POS/POW security module 72. As known to persons of ordinary skill in the art, these function/modules may be embodied in a single computer or in multiple computers or processing boards in a distributed system.

The MMM system and process enables the sys-admin and the person owning the PDP to marshal a wide array of security tools, with proper subdivisions for degrees of secret or sensitive data (TS, T, C, select, and critical data, among others). The MMM system maintains secure channels and hardware platforms for data flows into and out of the corporate computer system and the personal electronic devices used by persons.

Tactical Modules and Operations. Following strict document security system "Doc-Sec Sys" strict rules means that, once hackers and bad actors learn of each "strict rule" and take steps to avoid that Doc-Sec Sys rule, the threat/attack module 70 responds by increasing security protocol thereby overriding the initially-set Doc-Sec-sys rule and protocol. In the event a particular Bchn cell is infected by malware, the attack detection module 70 automatically responds by: (a) destroying/extinguishing the infected cells (resulting in CNT or OSDseg data destruction); (b) segmenting infected cells in a sandbox for later processing and potential recovery (a prune, remove and store-away CNT copies in different DSD sandbox data stores function); (c) placing the infected cell data OSDseg in a secure, separate sandbox as part or reconstruction module 66; or (d) destroying the infected cells in the infected Bchn, deleting the infected branch, and using supplemental data to re-grow the infected branch. The sandbox is best implemented in the reconstruction module 66. This re-growth of cells uses a new restore Ffnc using newly randomized fnc parameters for the newly formed cell stores while destroying infected cells (a FfncRESTORE).

In another scenario, if the infected data cell in the block chain is the only cell containing the critical data OSD-seg, then the restore Ffnc attempts to reconstruct OSDseg with "next best" replacement data. This restore function prunes or destroys the existing, potentially comprised branch or cell segments (infected data cells) from the remaining heathy branch/stems and then uses the OSD-Supple from the knowledge expander KE function to generate the next-best data compilation option. The infected data cells can be destroyed, yet the "near replacement" data may be sufficient to achieve the underlying objective of the MMM system which is the preservation of OSD.

The duplicate and one-by-one cell/branch defeat/delete data process (the restore process) may avoid the bad actor discovering the full extent of the system's Doc-Sec-Sys rule because the system's Doc-Sec-Sys rule is a series of layered rules which result in an ever-changing or formless blockchain system maintained on platform 12. The data trees or data constructs on platform 12 are randomly growing, changing, and evolving in a manner which is not easily detected by a hacking events on one blockchain in the forest of block chains. As described earlier, in a blockchain system, random follow-on blocks are minted for each access event and these newly minted access-log cells or blocks could reveal a hacking event. This is described above in connection with the UPP UA log cell added to the Bchn. An attack/hack attempt counter notes attempts-to-enter events and the counter triggers more aggressive data security processes, that is, more Bchns and more branches and stems. With this detection module, the Sys-Admin can identify digital crumbs left by the hacker (the crumbs located in the access-log cells) and thereafter alter downstream and upstream data stores ("downstream" referring to and defined by Bchns built at an earlier time on platform 12 and the term "upstream" referring to and defined by to-be-built new Bchns). By monitoring the bad actors and noting his or her attempts to access the Bchn cells, it is possible to defeat the bad actors by implementing more randomization into the DSD that is, randomness on platform 12.

For every initially identified adverse event, the MMM system and process can be programmed to either automatically apply indirect tactical responses or provide those options to the sys-admin operator. The MMM system and process has indirect tactical tools with the stem, fork and branch Bchn system. The security Bchn process are effectively inexhaustible.

False Data, False Data Stores and False Communication Channels. The MMM system and process, with its 3D stem, fork and branch Bchn, simulates disorder to outsiders and bad actors. The use of a forest of Bchn trees, each Bchn tree consisting of stems, forks and branches, postulates randomness. The use of unnecessary data (false flag or FF data or nonsensical data) in Bchn cells may act as a placeholder for critical CNT data in a particular Bchn cell. Further, the contextual filter/module as part of the KE engine 62 can be used to extract critical data and word-to-word adjacency data as contextual data which can be can be stored as additional data in a Blchn cell. See, for example, FIG. 2, branch 32.

The Bchn branches act as camouflage, indicating formlessness to onlooking bad actors, and are seeded with false data and false placeholders and nonsensical data. This is one important aspect of several important aspects relating to the use of a blockchain as a data construct for securing critical data. Stated otherwise, if bad actors are permitted access to platform 12, and if they are further permitted access to an entire blockchain data construct (FIG. 2 shows a single blockchain data construct), the bad actor would have access to all the critical data and all the false flag data located in that compromised blockchain data construct. The presence of false flag data in that compromised blockchain introduces another level of randomness and uncertainty when the bad actor attempts to reconstruct the OSD stored in that compromised blockchain. The informational content and accuracy of the DOM stored in that compromised blockchain (the DOM representing the structure of the OSD), can be seeded with false flag document structural data. Therefore, the bad actor's reconstruction efforts generate a poorly reconstructed version of the OSD and, in a best case scenario, a completely incomprehensible reconstructed document which lacks the critical informational value found in the original OSD. As a simple example, in an OSD describing the location of terrorist AB in country DE, the seeded DOM operating on seeded false flag data in the Bchn would describe the location of terrorist AB in country FR, thereby completely masking and destroying the critical informational value of the original OSD.

The use of AI/ML generated location of DSD data stores, as implemented by DLT systems (the Bchn functions described above can equally be implemented on DLT systems) also provide reasonable security. AI/ML generated Bchns enhance data security by the random growth, deletion, and redundant copying and interspersed with false flag data. AI/ML generated forks and branches on Bchns enhance data security. The AI/ML may generate the initial state parameters for the Ffnc, thereby increasing randomness in the data storage facility.

Nimble Variable Processes—Guerilla Warfare. These nimble variable processes implemented as data security measures are similar to guerilla warfare. The characteristics of such data warfare include: (a) recognizing that the enemy are one or more bad actors (hackers) and that those actors have overwhelming assets (skill sets that continually increase over time, are well capitalized, and have increasing numbers); and (b) the hackers have more time than data owners and the hackers have a longer time line to achieve their goals. The MMM system and process recognizes that (i) the defender, as the data owner, has a long term will to fight; and (ii) the data owner needs to accept that he or she may need to fight to the death for his or her data (stated otherwise, the data owner may have to decide to destroy the critical data rather than have that data fall into the hand of the hacker). Although difficult to accept, the data owner's "fight to death" characteristic means, in connection with document security ("Doc-Sec") protocol and the "Doc-Sec-Sys", that the data owner should consider data destruction of the OSD rather than releasing the OSD to the hacker. Complete destruction of OSD is commonplace in diplomatic evacuation situations. Guerilla warfare uses small, widely distributed forces, under loose command/control networks, to fight the superior invading force. In the case of this Doc-Sec-Sys, the superior invading force is the army of bad actors or hackers. The data owner can implement guerilla warfare tactics by dispersed Bchn data stores in the DSD, under loose command/control networks (CCN), which CCN are activated on an as-needed basis, with priority-based protocols.

Regarding data destruction, when the level of attack reaches an unacceptable level (determined by pre-programmed parameters), the MMM process can trigger either (a) independent and automatic cell-by-cell destruction by "burning" the Bchn cell; (b) overwriting the cell data; (c) destroying or overwriting the entire branch/stem or Bchn data construct. However, the "destroy order" or command sequence triggers this final data preservation event, resulting in wiping out the OSD data.

Dispersion. The MMM system and process discussed above provides tools for full and complete dispersion of critical data in the DSD data stores. The use of a Bchn data forest presents a cloak of disorder to the bad actor should he or she gain access to the Bchn through the platform gateway. The stem, fork and branch data structure results in subdivision of the OSD into dispersed OSDseg. The use of branches, with false flag FF and nonsensical data, masks strength and the OSD's IIV or EIV with weakness (the weakness being the FF data). The use of secondary content CNT in the form the supplemental data, OSDsupple1, 2, 3 etc., from secondary search (generated by the KE engine 62) establishes a cloak of disorder in the form of OSD-SuppleD1; OSD-SuppleD2; OSD-SuppleD1-Edit1; OSD-SuppleD1-Edit2 and OSD-SuppleD2-Edit1; and OSD-SuppleD2-Edit2, etc. Disorder is achieved by broadly expanding the AISO search and supplement routines with multiple feedback and pass-through loops through CCH/CCT processes and CCT filter/modules. Highly supplemented and edited SuppleD creates disorder, especially when stored on the stem, fork and branch Bchn. The original OSD can be reconstructed without this distracting Supple data because the initial state Ffnc and the initial state parameters for each Ffnc is known only to the sys-admin and may be stored off-platform in a secured location. For example, a full reconstruction of OSD may require the sys-admin to "clear" the reconstruction event by supplying the initial state parameters for the initial state Ffcn (assuming the Ffcn is stored on-platform). A higher level of security for OSD reconstruction can be obtained by requiring the sys-admin to supply BOTH the initial state Ffcn and the initial state parameters for that particular Bchn to platform 12 prior to reconstruction module 72 engaging in the reconstruction process. Another security protocol would require the Requester Rqtr of the Cnt to supply the initial state parameters when the sys-admin has the Ffnc to unlock the CNT from the Bchn forest. In this manner, the Rqtr has the secret passwords needed to obtain the critical data from the Bchn system.

Continual Content Update—A Living Secure Extendable Document. With the continual KE (knowledge expandable) content update module/process 62 ON, a living document is created. The automatic information search operations or AISO is ON, and the AISO continually updates the OSD constantly with supplemental data (OSDsuppleD1, 2, 3). The features of the living document include, among others: (a) continually updating content as in an always-ON condition (continual content update as a "CC-update," to add supplemental data content, Supple); and (b) the CC-update is limited either as (i) a time-based function or (ii) a bandwidth function (e.g., quantity of Supple data, quality of Supple data) triggering when the update will occur on what OSD Gens (search engines and data bases, etc.), and a limit on the quantity of search results, all of which will be the subject of the CC-update. The MMM system and process obtains the CC-update using, as its basis, a data extraction function operating on the OSD (the KE engine parses the OSD into smaller data segments, similar to OSDseg1, 2, 3, etc.) to generate search terms for searches Sch1, Sch2 (searches 1 and 2) used by the AISO and directed to the data collections (the OSD Gens or generators). The search terms are either OSDseg or contextually similar words/phrases from the OSD. The CC-update has an "addition" function wherein irrelevant data is added to the OSD (herein resulting in "additive" OSD, sometimes referred to herein as SuppleR ("R" referring to related additive search result data). Lastly, the resultant OSDsuppleD1, OSDsuppleD2, is further parsed and disbursed over DSD data stores so that hackers cannot ascertain, separate and discover the original OSD.

In more detail, the CC-update may be time-limited so that the update search is only engaged for a predetermined period of time. The discussion of a bandwidth limited CC-update is based upon outputs from OSD being acted upon by the CCT modules/filters discussed in the '301 and '785 patents. The CCT modules/filters generate search terms. Content search terms may be OSDseg data elements, that is, the critical data to be stored in the secure Bchn system, or may be larger or smaller parsed segments of the OSD used primarily to be fed into the search engine module of the ALSO to generate search results related to the OSD. As explained above, the AISO operates on data collections to generate the search results. The resultant search results output from the AISO are further trimmed or edited as needed. If the AISO is set to expand the important information in the OSD, then this process adds relevant Supple data from the search results to the OSD thereby expanding the informatic value IIV or EIV of the OSD. The result being OSDseg1+1[added relevant data from search 1], OSDseg1+2[added relevant data from search 2], etc. The term "bandwidth," when used in conjunction with the AISO, refers to limiting the knowledge expander KE engine to a predetermined number of searches or a predetermined number of search-returned documents (subject to "relevancy" extraction process for SuppleD data), or to a number of "relevant" words found in the search-returned documents. Other quantitative limits can be imposed on the AISO. The term "quality", when used in conjunction with the AISO, refers to the degree of relevancy of the extracted material or data from the search-returned documents.

Regrading false flag FF additive data, the KE engine 62 engages the content module/function and then locates antonyms for such content and then uses the antonyms to obtain negative or contrary information from the OSD Gens. Again, the knowledge expander engine 62 in a sense "expands" the OSD but in a manner that gives false information contrary to the original informatic data found in the OSD. In addition, false flag antonym data can be obtained using one of the CCT filter/modules. The operation of the contextual filter could generate opposite informatic data. For example, if the OSD indicates an additive value with the term "and", the contextual filter could impose the term "or" and conduct searches and generate results from OSD generators (OSD Gens) which represents the outputs from various data collections subject to data searches by the KE engine. The taxonomic filter/module in connection with false flag additive data, could change "human" characteristics to "animal" characteristics as a categoric filter operation. The false flag additive data would refer to "monkeys" when, in fact, the OSD was referring to "humans."

Regrading false flag FF additive data, the KE engine 62 engages the content module/function and then locates antonyms for such content and then uses the antonyms to obtain negative or contrary information from the OSD Gens. Again, the knowledge expander engine 62 in a sense "expands" the OSD but in a manner that gives false information contrary to the original informatic data found in the OSD. In addition, false flag antonym data can be obtained using one of the CCT filter/modules. The operation of the contextual filter could generate opposite informatic data. For example, if the OSD indicates an additive value with the term "and", the contextual filter could impose the term "or" and conduct searches and generate results from OSD generators (OSD Gens) which represents the outputs from various data collections subject to data searches by the KE engine. The taxonomic filter/module in connection with false flag additive data, could change "human" characteristics to "animal" characteristics as a categoric filter operation. The false flag additive data would refer to "monkeys" when, in fact, the OSD was referring to "humans."

Deviation By Intermixing Soft and Hard Security Measures. The MMM system and process can be programmed to provide deviation services by intermixing soft security measures on certain Bchns on the platform, with low levels of security on sacrificial Bchn branches. These sacrificial branches contain either false FF data or nonsensical data. Nonsensical data can be highly diluted data. For example, compare OSD-SuppleD1-Edit1; OSD-SuppleD1-Edit2 and OSD-SuppleD2-Edit1; OSD-SuppleD2-Edit2 with OSD-SuppleD1 and OSD-SuppleD2. The second and third search resultants, Edit2, 3, which starts with segmented OSD, which is thereafter supplemented as OSDsegSupple1, 2, is more further removed from the original OSD critical data (OSDseg) based upon either an expansive KE search or an "opposite" or "contradictory" search using content antonyms and/or contextually opposite search terms. The more the CCT function/modules cycle and recycle, generate first, second, third and fourth search terms for searches 1, 2, 3, 4, and activate the AISO for search 1, 2, 3, 4, to create OSD-SuppleD1-Edit3, 4, 5 and OSD-SuppleD1-Edit3, 4, 5, the more likely the resulting collected segmented data is highly diluted, not useful, and contains effective false flag data to the bad actor. Such actor's attention, if the falsely seeded Bchn or Bchn branch has low security access controls, is diverted away from the genuine OSDseg stored on the Bchn, and the hacker wastes his or her time. In effect, the poorly secured OSD-SuppleD1-Edit3, 4, 5 and OSD-SuppleD1-Edit3, 4, 5 act as honey pots to attract the bad actor's attention away from the OSDseg. As a result, important data is hidden away. Thus, taking a long and circuitous route for highly critical data, and enticing the bad actor with poorly guarded false data (on the poorly secure Bchns branches), establishes a diversionary measure amounting to deviation. As explained earlier, an entire Bchn may be seeded with FF data and low security access controls. An example of a low security access condition for a Bchn can be represented by the low security access password, such as "pass1234".

In connection with the adaptive attack detection function/module 70, if data owner believes that bad actors primarily originate from Russia, the sys-admin may increase generation of FF Bchns between the hours of 3 AM to 12 noon EST because, during that time frame, bad actors from Russia are more active than during the American working hours of 6 AM-6PM EST. During the American working hour time frame, the sys-admin may decrease the number of Bchn created or may increase the number of "delete-now" Bchns or Bchn branches as a counter measure.

As a further extension, the attack detection module/function 70 may monitor the "emotional state" of the Russian people and if the sys-admin identifies a wide spread derogatory American emotional condition in Russia, increase the false flag data deployment on platform 12. During more favorable emotional conditions detected in Russia, the sys-admin may revert to less aggressive Bchn growth and less aggressive distribution of false flag data. There are prior art technical systems which can identify "the emotional state" of a collection of persons and the outputs from these emotional state machines can be supplied to the attack detection module 70. In this manner, the MMM system and process measures the mood of bad actors and adjusts security protocols in response to the actors moods.

Value Added Machine: Formlessness Content Machine Functioning as an Automated Added Value Information Creation Machine. Although significant attention has been given to establishing and maintaining a secure data storage diaspora DSD, the MMM system and process can also be used to generate OSD having added internal informatic value (IIV) (added value to the data owner) and added external informatic value (EIV)(added value to third parties who are not data owners). As discussed above, some information has value because of its scarcity. The scarcity of data may change over time. Most people assume that all information becomes public and less valuable over long timeframes.

As explained in the '785 patent, the knowledge expander KE engine can be coupled to a categorizing machine that first assigns an enterprise-based label to data, and then searches OSD Gens that are non-enterprise-based data collections, data access platforms and data bases, in order to determine the "scarcity value" or trade secret value of the enterprise-collected data. The outputs of these machines enable the sys-admin to assign an EIV value to the collected data and monetize the same.

The MMM system and process can expand the data collection from the original OSD and maintain the secrecy, and hence the scarcity of the collected, enhanced data. In this manner, the Bchn forest discussed above can be used to monetize the collected data. This monetization may also include a UA log to track the visitor-user and gain information about who is seeing what data.

The UPP module 63 can permit a casual user to conduct a limited number of searches through the Bchn forest or collection of Bchns. For example, the casual user, once being registered in the UPP as a "visitor", can be limited to 2-3 searches. He or she can see the search results as snippets of related data, much like the search results from a GOOGLE® search platform. To obtain additional data, the casual visitor to platform 12 would be required to pay for the actual data collected by the KE engine 62. Once an indication of payment has been noted on the payment portal in FIG. 4, the OSDsupple data is released to the requester. In this manner, the sys-admin of platform 12 can monetize the expanded data.

In addition, the platform can inform the casual user registered-visitor that the KE engine will continue to gather relative documents for a pre-set period of time (for example, 48 hours) and if the casual user wishes to see this additional material, he or she can return to the platform, pay an additional sum of money, and view the further data collections once the platform has an indication of payment. The user in this operation would be assured that no other person or entity will have access to this 48 hour collection of data because the data collection is securely stored on the platform with security access codes unique to the casual user. This casual user-visitor is sometimes referred to as the Requester or "Rqtr."

As for monetization, in the first instance, data may be extracted from OSD information input by the Requester. The OSD input is the Rqtr search string, any Rqtr input data document and may include UA log data and the Rqtr's browser history, initially router address, Linked-in data, etc. This Rqtr data thereby forms exiled data which is distributed to secure data stores diasporas, forming the DSD. The DSD is described above in forming the forest of Bchn on the platform 12. The exiled data, now securely stored, has an origin (both the Rqtr and the author(s) of the input OSD) and a provenance. The provenance of the input Rqtr OSD is its authenticity (as established by the Rqtr data input), characteristics of originality (in the form a meta data) and source. The original source document or data stream (collectively referred to herein as OSD) forms a data "promised land." The data, securely stored in the Bchns can be reconstructed under strict, security protocols which do not change over time. Although the explanations above address time-based changeable events, those time-based events all enhance data security in the face of adverse events such as malicious data attacks and/or unexpected environmental event that may degrade the OSD.

The MMM system and method, with its attention to secure data storage, establishes a formula of survivability permitting the Rqtr or others, who have the Rqtr's platform access controls, to rebuild or reconstruct the OSD to its original state by retrieving the stored segments from different territorial "diasporas" to provide original promised land data. The identity of the people studying this historic secure OSD data is saved in the Bchn access log cells or UA logs as discussed above. In this manner, the editorial provenance data is saved in addition to the OSD.

The secure OSD data, even after being exposed to and edited by other Rqtrs, can be reconstructed in its original form and format, thereby signifying a return to the digital data homeland. The edited versions, still maintained on the Bchn, by the method and processes described above, integrates the various editions or Rqtrs through the subject time period. This process establishes a survivability formula and the ultimate success formula for the Requesters who need secure access to the OSD and complete editions of the OSD and a log of Requesters who provided those edits. The promised data land enjoys natural growth by its various additive edits by various Requester, and if needed, the OSD can integrate automatic information searches operations AISOs which lead to automated creation of wealth.

Revenue Split from Use of OSD Data. With the use of the KE engine 62, a revenue generating Bchn (Bchn-REV) can be created. This Bchn-REV includes smart contacts on the Bchn which split revenue from, for example, OSD Supple on financial products (stocks, bonds, index funds) and share revenue with the Rqtr and the platform owner. The Requester Rqtr can seed the OSD module 60 and KE engine 62 with key data, such as financial data. The OSD module 60 and KE engine 62 can be continually ON, generating OSDsupple etc material. This generated material can be securely stored in a Rqtr-specific Bchn on the platform. When needed, the Rqtr can access his or her secure data and the sys-admin can review a portion of the financial product by use of a smart contract embedded in the Bchn. The revenue being split between the Rqtr and the sys-admin.

The claims appended hereto are meant to cover modifications, changes, and improvements within the scope and spirit of the present invention.

What is claimed is:

1. A method for securing critical data on a distributed ledger (DL) or blockchain (Bchn), wherein each respective DL or Bchn is formed by corresponding linked cells wherein each linked cell has a cellular immutability characteristic and a cellular connectivity characteristic comprising:
randomly storing critical data in random cells of the respective DL or Bchn, wherein the random storing is determined by a predetermined initial state function and the predetermined initial state function (ISF) includes at least one ISF from the group of ISFs including one or more of (a) a predetermined critical data storing ISF wherein the critical data is stored, in a random manner, in certain cells based upon a predetermined mathematic function, (b) a predetermined initial state cellular Q ISF based upon a predetermined initial state cellular quantity (Q) wherein the critical data is stored in the certain cells, (c) a predetermined time-based ISF based upon a predetermined initial state time-based cell creation, activation or fork condition wherein the critical data is stored in the certain cells, (d) a predetermined nonsensical ISF function which function is inferior to the critical data storage ISF function and which randomly stores critical data in certain cells and concurrently stores nonsensical data in other cells, (e) a predetermined inferior nonsensical supplemental ISF which stores nonsensical supplemental data in the cells concurrently with the critical data storage in the certain cells, (f) a predetermined inferior forking ISF wherein one or more branch cells storing critical data are forked off by a predetermined forking protocol, (g) a predetermined new stem growth ISF which adds a one or more predetermined new stem cells to the blockchain and stores the critical data, (h) a predetermined linking ISF which links two existing blockchains via a predetermined number of linking cells storing the critical data, (i) a predetermined resetting data ISF wherein critical data earlier stored is copied and then randomly stored as copied critical data in another set of random cells, or (j) a predetermined reset and extinguish critical data ISF wherein the critical data is first copied, the copied data is randomly stored in other cells, and then the initially copied critical data is deleting or extinguished; and storing nonsensical data in other cells, other than the random cells, in the respective DL or Bchn.

2. The method for securing critical data in the respective DL or Bchn as claimed in claim 1 wherein the respective DL or Bchn has further cells other than the random cells and the nonsensical cells.

3. The method for securing critical data in the respective DL or Bchn as claimed in claim 1 wherein the respective DL or Bchn has a series of stem cells therein, the method including forking a series of branch cells off the stem cells in the respective DL or Bchn with the predetermined forking initial state function.

4. The method for securing critical data in the respective DL or Bchn as claimed in claim 3 wherein the predetermined forking initial state function includes the initial state cellular quantity or a time-based condition.

5. The method for securing critical data in the respective DL or Bchn as claimed in claim 4 including growing either or both (i) new growth branch cells on the respective DL or Bchn or (ii) new growth stem cells on the respective DL or Bchn.

6. The method for securing critical data in the respective DL or Bchn as claimed in claim 5 wherein the respective DL or Bchn is a first respective DL or Bchn, the method including:
generating a forest of DLs or Bchns, the forest having a plurality of n corresponding DLs or a plurality of n corresponding Bchns;
randomly storing critical data in random cells of the corresponding DLs or Bchns in the forest; and
storing nonsensical data in other cells, other than the random cells, in the corresponding DLs or Bchns in the forest.

7. The method for securing critical data in the respective DL or Bchn as claimed in claim 2 including:
conducting automatic information search operations (AISO) through data collections external to the respective DL or Bchn using segments of the critical data to obtain supplemental data;
linking the supplemental data to the segments of critical data; and
dispersing and storing the linked supplemental data randomly in the respective DL or Bchn.

8. The method for securing critical data in the respective DL or Bchn as claimed in claim 1 wherein the respective DL or Bchn has a series of stem cells therein, the method including:
detecting a cyber attack directed to the respective DL or Bchn;
forking a series of branch cells off the stem cells on the respective DL or Bchn by executing the predetermined forking initial state function wherein the series of branch cells form a branch on the respective DL or Bchn; and
growing, responsive to the cyber attack, either or both (i) new growth branch cells on the respective DL or Bchn or (ii) new growth stem cells on the respective DL or Bchn.

9. The method for securing critical data in the respective DL or Bchn as claimed in claim 8 including:
pre or post cyber attack, conducting automatic information search operations (AISO) through internal or external data collections using segments of the critical data to obtain supplemental data;
linking the supplemental data to the segments of critical data; and
dispersing and storing the linked supplemental data randomly in the respective DL or Bchn.

10. The method for securing critical data in the respective DL or Bchn as claimed in claim 1 wherein the randomly stored critical data represents personal data owned by a person or corporate data owned by a corporation, and the method includes:
permitting access to (i) the personal data only with personal authorization or (ii) the corporate data only with corporate authorization.

11. The method for securing critical data in the respective DL or Bchn as claimed in claim 1 wherein randomly storing applies the predetermined critical data initial state function and wherein the storing nonsensical data applies the predetermined nonsensical initial state function, the nonsensical function being inferior to the critical data function; the method including one or more of the storing processes:
(i) data supplementation by conducting automatic information search operations (AISO) through data collections using segments of the critical data to obtain supplemental data, linking the supplemental data to the segments of critical data, and storing the linked supplemental data randomly in the respective DL or Bchn, the supplemental data dispersion determined by a predetermined supplementation initial state function;
(ii) forking a series of branch cells off a series of stem cells in the respective DL or Bchn, the forking determined with the predetermined forking initial state function which is different than the predetermined critical data initial state function, and growing new growth branch cells on the respective DL or Bchn with a new growth initial state function;
(iii) growing new growth stem cells on the respective DL or Bchn with the new stem growth initial state function;
(iv) linking a first DL or Bchn to a second DL or Bchn with the linking initial state function;
(v) resetting critical data by copying the critical data, randomly storing the copied data in random cells of the respective DL or Bchn, wherein the random storing of copied data is determined by the predetermined resetting initial state function; and,
(vi) resetting with follow-on extinguishment of critical data by first copying the critical data, second randomly storing the copied data in random cells of the respective DL or Bchn, and third extinguishing or deleting the original critical data, wherein the random storing of copied data is determined by the predetermined reset plus extinguish initial state function.

12. The method for securing critical data in the respective DL or Bchn as claimed in claim 11 including:
forking a series of branch cells off a series of stem cells in the respective DL or Bchn, the forking determined with the predetermined forking initial state function which is different than the critical data initial state function;
growing new growth branch cells on the respective DL or Bchn with a new growth initial state function; and
extinguishing the series of branch cells with an extinguish branch initial state function.

13. A method for securing critical data and retrieving the critical data on a distributed ledger (DL) or blockchain (Bchn), wherein each respective DL or Bchn is formed by corresponding linked cells wherein each linked cell has a cellular immutability characteristic and a cellular connectivity characteristic comprising:
   randomly storing critical data in random cells of the respective DL or Bchn, wherein the random storing is determined by a predetermined critical data initial state function;
   storing nonsensical data in other cells, other than the random cells, in the respective DL or Bchn, by a predetermined nonsensical initial state function which is inferior to the critical data function; and
   retrieving and reconstructing the critical data by extracting the randomly stored critical data using the critical data function.

14. The method for securing and retrieving critical data in the respective DL or Bchn as claimed in claim 13 wherein the respective DL or Bchn has further cells other than the random cells and the nonsensical cells.

15. The method for securing and retrieving critical data in the respective DL or Bchn as claimed in claim 13 wherein the respective DL or Bchn has a series of stem cells therein, the method including forking a series of branch cells off the stem cells in the respective DL or Bchn with a predetermined forking initial state function.

16. The method for securing and retrieving critical data in the respective DL or Bchn as claimed in claim 15 wherein the predetermined forking initial state function includes an initial state cellular quantity or a time-based condition.

17. The method for securing and retrieving critical data in the respective DL or Bchn as claimed in claim 16 including growing either or both (i) new growth branch cells on the respective DL or Bchn or (ii) new growth stem cells on the respective DL or Bchn.

18. The method for securing and retrieving critical data in the respective DL or Bchn as claimed in claim 17 wherein the respective DL or Bchn is a first respective DL or Bchn, the method including:
   generating a forest of DLs or Bchns, the forest having a plurality of n corresponding DLs or a plurality of n corresponding Bchns;
   randomly storing critical data in random cells of the corresponding DLs or Bchns in the forest; and
   storing nonsensical data in other cells, other than the random cells, in the corresponding DLs or Bchns in the forest.

19. The method for securing and retrieving critical data in the respective DL or Bchn as claimed in claim 14 including:
   conducting automatic information search operations (AISO) through data collections external to the respective DL or Bchn using segments of the critical data to obtain supplemental data;
   linking the supplemental data to the segments of critical data; and
   dispersing and storing the linked supplemental data randomly in the respective DL or Bchn.

20. The method for securing and retrieving critical data in the respective DL or Bchn as claimed in claim 13 wherein the respective DL or Bchn has a series of stem cells therein, the method including:
   detecting a cyber attack directed to the respective DL or Bchn;
   forking a series of branch cells off the stem cells on the respective DL or Bchn by executing a predetermined forking initial state function wherein the series of branch cells form a branch on the respective DL or Bchn; and
   growing, responsive to the cyber attack, either or both (i) new growth branch cells on the respective DL or Bchn or (ii) new growth stem cells on the respective DL or Bchn.

21. The method for securing and retrieving critical data in the respective DL or Bchn as claimed in claim 20 including:
   pre or post cyber attack, conducting automatic information search operations (AISO) through internal or external data collections using segments of the critical data to obtain supplemental data;
   linking the supplemental data to the segments of critical data; and
   dispersing and storing the linked supplemental data randomly in the respective DL or Bchn.

22. The method for securing and retrieving critical data in the respective DL or Bchn as claimed in claim 13 wherein the randomly stored critical data represents personal data owned by a person or corporate data owned by a corporation, and the method includes:
   permitting access to (i) the personal data only with personal authorization or (ii) the corporate data only with corporate authorization.

23. The method for securing and retrieving critical data in the respective DL or Bchn as claimed in claim 13 including one or more of the storing processes:
   (i) data supplementation by conducting automatic information search operations (AISO) through data collections using segments of the critical data to obtain supplemental data, linking the supplemental data to the segments of critical data, and storing the linked supplemental data randomly in the respective DL or Bchn, the supplemental data dispersion determined by a predetermined supplementation initial state function;
   (ii) forking a series of branch cells off a series of stem cells in the respective DL or Bchn, the forking determined with the forking function which is different than the critical data function, and growing new growth branch cells on the respective DL or Bchn with a new growth initial state function;
   (iii) growing new growth stem cells on the respective DL or Bchn with a new stem growth initial state function;
   (iv) linking a first DL or Bchn to a second DL or Bchn with a linking initial state function;
   (v) resetting critical data by copying the critical data, randomly storing the copied data in random cells of the respective DL or Bchn, wherein the random storing of copied data is determined by a predetermined resetting initial state function; and,
   (vi) resetting with follow-on extinguishment of critical data by first copying the critical data, second randomly storing the copied data in random cells of the respective DL or Bchn, and third extinguishing or deleting the original critical data, wherein the random storing of copied data is determined by a predetermined reset plus extinguish initial state function.

24. The method for securing and retrieving critical data in the respective DL or Bchn as claimed in claim 13 including:
   forking a series of branch cells off a series of stem cells in the respective DL or Bchn, the forking determined with a predetermined forking initial state function which is different than the critical data function;
   growing new growth branch cells on the respective DL or Bchn with a new growth initial state function; and
   extinguishing the series of branch cells with an extinguish branch initial state function.

25. The method for securing and retrieving critical data in the respective DL or Bchn as claimed in claim 23 wherein the nonsensical is irrelevant to the critical data.

26. The method for securing and retrieving critical data in the respective DL or Bchn as claimed in claim 13 including:
supplementing critical data by conducting automatic information search operations (AISO) through data collections using segments of the critical data to obtain supplemental data;
linking the supplemental data to the segments of critical data;
storing the linked supplemental data randomly in the respective DL or Bchn, the supplemental data dispersion determined by a predetermined supplementation initial state function;
upon accepting an indication of payment, either (a) retrieving, reconstructing and presenting the critical data by extracting the randomly stored critical data using the critical data function, or (b) retrieving, reconstructing and presenting the critical data by extracting the randomly stored critical data using the critical data function and retrieving and reconstructing the supplemental data using the supplementation function.

27. A method for securing critical data and retrieving the critical data in a computer memory, wherein the computer memory includes memory cells, and wherein a subset of memory cells are linked together by a cellular connectivity characteristic and a cellular immutability characteristic, thereby forming linked memory cells, the method comprising:
randomly storing critical data in random cells of the linked memory cells, wherein the random storing is determined by a predetermined critical data initial state function;
storing nonsensical data in other cells, other than the random cells, in the linked memory cells, by a predetermined nonsensical initial state function which is inferior to the critical data function; and
retrieving and reconstructing the critical data by extracting the randomly stored critical data using the critical data function.

28. The method for securing and retrieving critical data in the linked memory cells as claimed in claim 27 wherein the linked memory cells have a series of stem cells therein, the method including forking a series of branch cells off the stem cells in the linked memory cells with a predetermined forking initial state function.

29. The method for securing and retrieving critical data in the linked memory cells as claimed in claim 28 including
growing either or both (i) new growth branch cells on the linked memory cells or (ii) new growth stem cells on the linked memory cells.

30. The method for securing and retrieving critical data in the linked memory cells as claimed in claim 27 including:
conducting automatic information search operations (AISO) through data collections using segments of the critical data to obtain supplemental data;
linking the supplemental data to the segments of critical data; and
dispersing and storing the linked supplemental data randomly in the linked memory cells using a predetermined supplemental data initial state function.

31. The method for securing and retrieving critical data in the linked memory cells as claimed in claim 27 wherein the linked memory cells have a series of stem cells therein, the method including:

detecting a cyber attack directed to the linked memory cells;
forking a series of branch cells off the stem cells on the linked memory cells by executing a predetermined forking initial state function wherein the series of branch cells form a branch on the linked memory cells; and
growing, responsive to the cyber attack, either or both (i) new growth branch cells on the linked memory cells or (ii) new growth stem cells on the linked memory cells.

32. The method for securing and retrieving critical data in the linked memory cells as claimed in claim 31 including:
pre or post cyber attack, conducting automatic information search operations (AISO) through data collections using segments of the critical data to obtain supplemental data;
linking the supplemental data to the segments of critical data; and
dispersing and storing the linked supplemental data randomly in the linked memory cells with a predetermined supplementation initial state function.

33. The method for securing and retrieving critical data in the linked memory cells as claimed in claim 27 including one or more of the storing processes:
(i) data supplementation by conducting automatic information search operations (AISO) through data collections using segments of the critical data to obtain supplemental data, linking the supplemental data to the segments of critical data, and storing the linked supplemental data randomly in the linked memory cells, the supplemental data dispersion determined by a predetermined supplementation initial state function;
(ii) forking a series of branch cells off a series of stem cells in the linked memory cells, the forking determined with a predetermined forking initial state function which is different than the critical data function, and growing new growth branch cells on the linked memory cells with a new growth initial state function;
(iii) growing new growth stem cells on the linked memory cells with a new stem growth initial state function;
(iv) linking a first linked memory cells to a second linked memory cells with a linking initial state function;
(v) resetting critical data by copying the critical data, randomly storing the copied data in random cells of the linked memory cells, wherein the random storing of copied data is determined by a predetermined resetting initial state function; and,
(vi) resetting with follow-on extinguishment of critical data by first copying the critical data, second randomly storing the copied data in random cells of the linked memory cells, and third extinguishing or deleting the original critical data, wherein the random storing of copied data is determined by a predetermined reset plus extinguish initial state function.

34. The method for securing critical data in the linked memory cells as claimed in claim 27 including:
forking a series of branch cells off a series of stem cells in the linked memory cells, the forking determined with a predetermined forking initial state function which is different than the critical data function;
growing new growth branch cells on the linked memory cells with a new growth initial state function; and
extinguishing the series of branch cells with an extinguish branch initial state function.

35. The method for securing and retrieving critical data in the linked memory cells as claimed in claim 33 wherein the nonsensical is irrelevant to the critical data.

36. The method for securing and retrieving critical data in the linked memory cells as claimed in claim 27 including:
   supplementing critical data by conducting automatic information search operations (AISO) through data collections using segments of the critical data to obtain supplemental data;
   linking the supplemental data to the segments of critical data;
   storing the linked supplemental data randomly in the linked memory cells, the supplemental data dispersion determined by a predetermined supplementation initial state function;
   upon accepting an indication of payment, either (a) retrieving, reconstructing and presenting the critical data by extracting the randomly stored critical data using the critical data function, or (b) retrieving, reconstructing and presenting the critical data by extracting the randomly stored critical data using the critical data function and retrieving and reconstructing the supplemental data using the supplementation function.

37. A method for securing critical data and retrieving the critical data in a computer memory, wherein the computer memory includes memory cells, and wherein a subset of memory cells are linked together by a cellular connectivity characteristic and a cellular immutability characteristic, thereby forming linked memory cells, the method comprising:
   a data storage diaspora (DSD) formed by a plurality of linked cells;
   randomly storing critical data in random cells of the linked memory cells in the DSD to from exiled data, wherein the random storing is determined by a predetermined critical data initial state function;
   storing nonsensical data in other cells, other than the random cells, in the linked memory cells in the DSD, by a predetermined nonsensical initial state function which is inferior to the critical data function; and
   retrieving and reconstructing the critical data by extracting the randomly stored critical data using the critical data function from the DSD, thereby maintaining a provenance, an authenticity, an originality, and a source of the critical data.

38. The method for securing and retrieving critical data in the linked memory cells as claimed in claim 37 including:
   supplementing critical data by conducting automatic information search operations (AISO) through data collections using segments of the critical data to obtain supplemental data;
   linking the supplemental data to the segments of critical data;
   storing the linked supplemental data randomly in the linked memory cells, the supplemental data dispersion determined by a predetermined supplementation initial state function;
   upon accepting an indication of payment, either (a) retrieving, reconstructing and presenting the critical data by extracting the randomly stored critical data from the DSD using the critical data function, or (b) retrieving, reconstructing and presenting the critical data by extracting the randomly stored critical data from the DSD using the critical data function and retrieving and reconstructing the supplemental data using the supplementation function;
   thereby forming a living data structure.

* * * * *